(12) United States Patent
Thayumanavan et al.

(10) Patent No.: US 8,198,368 B2
(45) Date of Patent: Jun. 12, 2012

(54) CLEAVABLE BLOCK COPOLYMERS, FUNCTIONALIZED NANOPOROUS THIN FILMS AND RELATED METHODS OF PREPARATION

(75) Inventors: Sankaran Thayumanavan, Amerst, MA (US); Akamol Klaikherd, Amherst, MA (US); Suhrit Ghosh, Kolkata (IN)

(73) Assignee: University of Massachusetts, Boston, MA (US)

( * ) Notice: Subject to any disclaimer, the term of this patent is extended or adjusted under 35 U.S.C. 154(b) by 583 days.

(21) Appl. No.: 12/253,535

(22) Filed: Oct. 17, 2008

(65) Prior Publication Data

US 2009/0105427 A1   Apr. 23, 2009

Related U.S. Application Data

(60) Provisional application No. 60/999,330, filed on Oct. 17, 2007.

(51) Int. Cl.
*C08F 228/04* (2006.01)
*C08L 53/00* (2006.01)

(52) U.S. Cl. ........ 525/92 J; 525/88; 525/89; 525/328.5; 525/535; 525/537

(58) Field of Classification Search ............. 525/88, 525/92 J, 89, 328.5, 535, 537
See application file for complete search history.

(56) References Cited

U.S. PATENT DOCUMENTS

2007/0221917 A1   9/2007 Chin et al.

OTHER PUBLICATIONS

Klaikherd et al; A facile method for the synthesis of cleavable block copolymers from ATRP-Based homopolymers; Macromolecules, Washington DC, 2007, 40(24), 8518-8520, Chem Abstract 148: 55437.*

* cited by examiner

*Primary Examiner* — Duc Truong
(74) *Attorney, Agent, or Firm* — Reinhart Boerner Van Deuren s.c.

(57) ABSTRACT

Cleavable, disulfide-coupled block copolymers as can be used in the preparation of nanoporous thin films, micellar configurations and related structures.

20 Claims, 28 Drawing Sheets
(27 of 28 Drawing Sheet(s) Filed in Color)

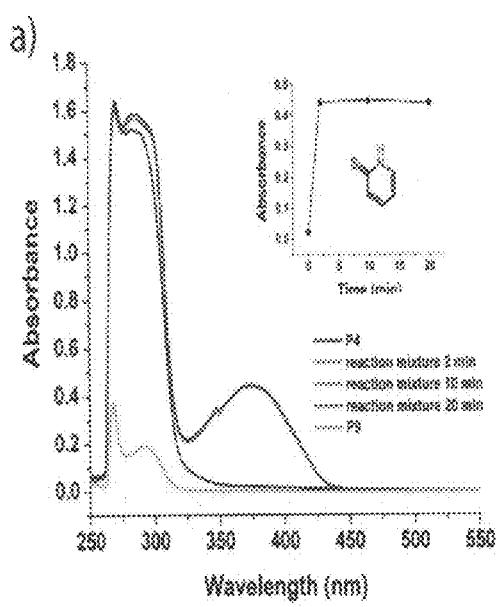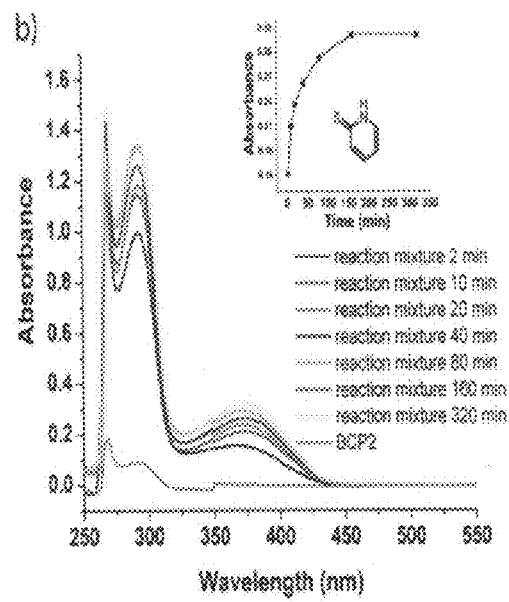
Figure 6A
Figure 6B

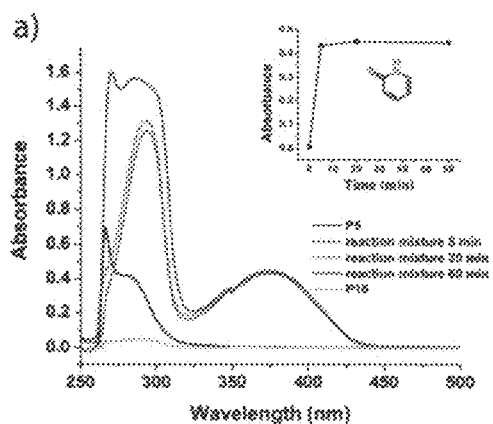 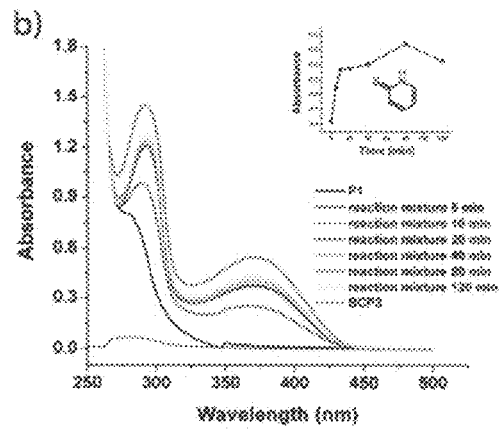
Figure 10A  Figure 10B
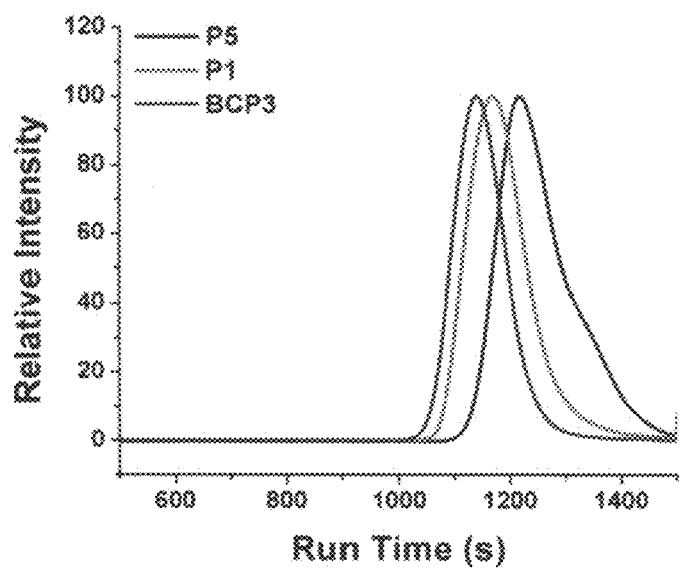
Figure 11

Nile red

CAC = 0.1mg/mL

CLEAVABLE BLOCK COPOLYMERS, FUNCTIONALIZED NANOPOROUS THIN FILMS AND RELATED METHODS OF PREPARATION

This application claims priority benefit of provisional application Ser. No. 60/999,330, filed on Oct. 17, 2007, which application is hereby incorporated by reference in its entirety.

The United States government has certain rights to this invention pursuant to Grant No. CHE-0739227 from the National Science Foundation to the University of Massachusetts.

BACKGROUND OF THE INVENTION

Block copolymers continue to garner significant interest due to their propensity to form self-assembled nanostructures, the morphologies of which are determined by the mutual compatibility and the volume fractions of the constituent blocks. To use such copolymers to create nanoporous structures, one of the blocks should be selectively degraded after assembly. Techniques to achieve such structures typically involve rather harsh conditions and/or are limited to a few classes of polymers. Recently, a synthetic methodology has been reported in which acid-catalyzed cleavage of PS-PEO block copolymers can be achieved under mild conditions, which has been used subsequently to generate nanoporous thin films. However, the use of such an acid-labile linker moiety is restricted to but a few block copolymers. Further, such an approach does not provide a reactive residual functional group for subsequent chemistry on the resulting nanopore wall.

Various other techniques have been utilized to selectively degrade or remove one of the copolymer blocks. Such techniques include chemical etching, uv-degradation, ozonolysis, and the like. However, such processes tend to be unduly harsh with respect to degradation of either the block structure or resulting terminal group functionality. As a consequence, thin film integrity, or nanopore structure and definition and/or pore wall functionality can be compromised.

SUMMARY OF THE INVENTION

In light of the foregoing, it is an object of the present invention to provide a range of block copolymers and/or methods(s) for their synthesis and/or assembly, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It is an object of the present invention to provide a general synthetic methodology for access to a wide range of cleaveable block copolymers.

It can be another object of the present invention to provide block copolymers cleaveable under mild reaction conditions, without degradation of polymer chain or terminal group functionality, to facilitate further chemistry.

It can be another object of the present invention, alone or in conjunction with one or more of the preceding objectives, to provide a synthetic approach with good polydispersity control with regard to copolymer block constituents, with respect to post-cleavage nanostructures.

It can be another object of the present invention, alone or in conjunction with one or more of the preceding objectives, to provide nanoporous thin film materials with functionalized nanopore walls, as can be used for interaction with other components and/or chemical moieties for a range of detection or sensor applications, and as can be used in the fabrication of a diverse range of nanostructures.

Other objects, features, benefits and advantages of the present invention will be apparent from this summary and the following descriptions of certain embodiments, and will be readily apparent to those skilled in the art having knowledge of various block copolymers, related nano-structures and methods for their preparation. Such objects, features, benefits and advantages will be apparent from the above as taken into conjunction with the accompanying examples, data, figures and all reasonable inferences to be drawn therefrom, alone or with consideration of the references incorporated herein.

In part, the present invention can be directed to a disulfide coupled block copolymer. Such a polymer can be of a formula

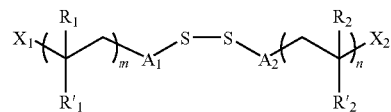

wherein $R_1$, $R'_1$, $R_2$ and $R'_2$ can be independently selected from H, alkyl, substituted alkyl, aryl, substituted aryl, carboxy, substituted carboxy, alkoxycarbonyl, substituted alkoxycarbonyl, aminocarbonyl and substituted aminocarbonyl moieties; m and n can be independently selected from integers greater than 1; $A_1$ and $A_2$ can be independently selected from non-halide moieties of available atom transfer radical polymerization (ATRP) initiation reagents; and $X_1$ and $X_2$ can be independently selected from various blocks of other repeating monomeric units, halide moieties of ATRP initiation reagents, and terminal moieties and/or monomeric blocks of the sort as can be introduced during polymerization, isolation and/or subsequent use or reaction.

In certain non-limiting embodiments, at least one of $R_1$, $R'_1$, $R_2$ and $R'_2$ can be a substituted carboxy moiety. In certain such embodiments, such a substituent can comprise an N-succinimdyl moiety. Likewise, in certain such embodiments, at least another of the pendent R moieties can be a phenyl moiety. Regardless, with respect to such ATRP reagents, $A_1$ and $A_2$ can be selected from various alkoxycarboxyalkyl moieties. In certain such embodiments, $A_1$ and $A_2$ can be ethylcarboxylsopropyl moieties, and $X_1$ and $X_2$ can be bromide.

In certain non-limiting embodiments, active terminal moieties (i.e., $X_1$ and $X_2$) of such a copolymer can be reacted with one or more additional vinyl monomers under ATRP conditions to provide another polymeric block of repeating monomeric units. For instance, if a polymer of the aforementioned formula can be described as an AB diblock copolymer and represented as A(S-S)B, alternatively, further or subsequent reaction with such or additional monomers (e.g., C and/or D) can be used to provide triblock (e.g., CA(S-S)B, A(S-S)BC or AB(S-S)C) or tetrablock (e.g., CA(S-S)BD, AB(S-S)CD or ABC(S-S)D) or other such multi-block copolymers, with variable location of the disulfide linkage depending on choice of monomer reaction order. Regardless of such polymeric growth or further reaction, such a copolymer can be provided as a microphase-separated thin film. Contact of such a copolymer with disulfide reducing agent, and subsequent removal of a polymeric block therefrom can provide ordered nano-dimensioned pores through such a thin film material.

In part, the present invention can also be directed to a method of preparing a disulfide-coupled block copolymer. Such a method can comprise providing a first polymer block comprising a thiol terminal moiety, such first block comprising the atom transfer polymerization product of a first vinyl monomer; providing a second polymer block comprising a pyridyldisulfide terminal moiety, such a second block comprising the atom transfer polymerization product of a second vinyl monomer; and reacting the terminal moieties to couple the first and second polymer blocks and provide a block copolymer thereof. With respect to certain embodiments, a resulting block copolymer can be of a formula

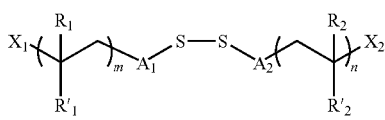

wherein $R_1$, $R'_1$, $R_2$ and $R'_2$ can be independently selected from H, alkyl, substituted alkyl, aryl, substituted aryl, carboxy, substituted carboxy, alkoxycarbonyl, substituted alkoxycarbonyl, aminocarbonyl and substituted aminocarbonyl moieties; m and n can be independently selected from integers greater than 1; $A_1$ and $A_2$ can be independently selected from non-halide moieties of available atom transfer radical polymerization (ATRP) initiation reagents; and $X_1$ and $X_2$ can be independently selected from various other monomeric blocks, halide moieties of ATRP initiation reagents, and terminal moieties and/or monomeric blocks of the sort as can be introduced during polymerization, isolation and/or subsequent use and/or reaction.

In certain embodiments, as illustrated below, at least one of the first and second vinyl monomers can be selected from a methylacrylate monomer and styrene monomer. Regardless of monomer identity or resulting copolymer structure, each constituent polymeric block can be provided with a polydispersity index typically less than about 1.30. Active terminal moieties (i.e., $X_1$ and $X_2$) of such a polymer can provide for further reaction with one or more additional and/or different vinyl monomers under ATRP conditions and with comparable polydispersity control.

In certain non-limiting embodiments, one of the m and n blocks can be hydrophilic, and the other block can be hydrophobic such a copolymer as would be amphiphilic as would be understood in the art. In certain such embodiments, one of $R_1$, and $R_2$ (or $R'_1$, and $R'_2$) can comprise a moiety exhibiting temperature-dependent reversible hydrophilic-hydrophobic characteristics, and one of $R_1$, and $R_2$ (or $R'_1$, and $R'_2$) can comprise a moiety exhibiting acid-sensitive hydrophobic-hydrophilic characteristics. In certain such embodiments, such a temperature-dependent moiety can comprise an N-isopropylaminocarbonyl moiety, and such an acid-sensitive moiety can comprise a dihydropyran-protected hydroxy-substituted moiety acrylate moiety—each as illustrated below.

Regardless, such an amphiphilic copolymer can be provided in a fluid medium, at a concentration at least partially sufficient for micelle formulation/configuration. Such a micellar configuration can be contacted with and/or introduced to a stimulus selected from temperature, an acid and a disulfide reducing agent—or a combination of such stimuli—at least partially sufficient to disrupt the micellar configuration. In certain embodiments, such a micellar configuration can compromise, contain and/or envelope a component therein, providing a corresponding composition. Without limitation, if provided in an aqueous medium comprising a hydrophobic component, such a component can be within the micellar configuration. Micelle disruption by one or more of the aforementioned stimuli can release the hydrophobic component into the medium.

In part, the present invention can be directed to a disulfide-coupled block copolymer of a formula

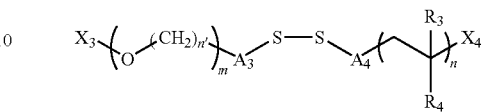

wherein $R_3$ and $R_4$ can be independently selected from H, alkyl, substituted alkyl, aryl, substituted aryl and other moieties of the sort mentioned above and illustrated elsewhere herein; m and n can be integers independently selected from integers greater than 1, for each respective m and n block; n' can be an integer selected from 1 to about 3; $A_3$ can be an alkylcarboxy moiety; $A_4$ can be selected from non-halide moieties of atom transfer radical polymerization initiation reagents and reversible addition fragmentation chain transfer initiation reagents; and $X_3$ and $X_4$ can be independently selected from other blocks of repeating monomeric units, moieties of said initiation reagents and polymer terminal moieties.

In certain non-limiting embodiments, $R_4$ can be a phenyl moiety and the n block can comprise repeating styrene monomeric units. In certain such embodiments, $A_4$ can be an ethoxycarbonyl moiety and the block comprises an atom transfer radical polymerization product. As such $X_4$ can be selected from a bromide moiety and another block of another repeating monomeric unit. Regardless n' can be 2 and said m block can comprise repeating polyethylene oxide monomeric units.

In certain other embodiments, $A_4$ can be selected from alkoxycarbonylalkyl and alkoxycarbonyl moieties. In certain such embodiments, $A_4$ can be an ethoxycarbonyl moiety, $R_4$ can be a phenyl and the n block can comprise a reversible addition fragmentation chain transfer polymerization product. Regardless of identity of $A_4$, $R_3$-$R_4$ and/or $X_4$, in certain embodiments, n' can be 2 with said m block comprising a block of repeating polypropylene oxide monomeric units.

The present invention can be considered more broadly in various aspects. Accordingly, this invention can comprise a first block component selected from repeating alkylene oxide, alkylene and substituted alkylene monomeric units; and a second block component selected from repeating alkylene and substituted alkylene monomeric units, such first and second blocks coupled with a moiety comprising a disulfide group. Such substituents can be as described above or as illustrated elsewhere herein. Without limitation such a copolymer can be of a formula provided above as illustrated elsewhere herein.

Regardless, one such block can be coupled to another block of another repeating monomeric unit. Such a compound can be selected from tri- or other multi-block copolymers, non-random copolymers and/or segmented copolymers comprising a plurality of one or more other repeating monomeric units and/or blocks thereof. Such polymeric structures, without limitation, are contemplated within the broader aspects of this invention regardless of choice of A, R and/or X.

Without limitation as to the identify or structure of any monomeric repeating unit, block thereof, the number of block constituents or resulting copolymer structure, reaction with a disulfide reducing agent can cleave the aforementioned first and second polymeric blocks. One of the resulting thiol-terminated blocks can then be removed. In certain embodiments, such removal can comprise contact with a fluid medium and/or solublizing at least a portion of the block constituent. Where the block copolymer is provided as a thin film, removal of one thiol-terminated block can result in formation of nano-dimensioned pores in the film material. In certain such embodiments, one block constituent can comprise less than about 50 mole percent of the copolymer and/or a volume fraction less than about 50% of the thin film material, and such a block can be selectively removed for nanopore formation.

Accordingly, this invention can also be directed to a thin film comprising a polymeric component of a formula

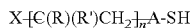

wherein R and R' can be independently selected from H, alkyl, substituted alkyl, aryl, substituted aryl, carboxy, substituted carboxy, alkoxycarbonyl, substituted alkoxycarbonyl, aminocarbonyl and substituted aminocarbonyl moieties; n can be selected from integers greater than 1; A can be independently selected from non-halide moieties of available ATRP reagents; and X can be selected from various monomeric blocks, halide moieties of ATRP initiation reagents, and terminal moieties and/or monomeric blocks of the sort as can be introduced during polymerization, isolation and/or subsequent use or reaction such a material as can also comprise nano-dimensioned pores therethrough, and defining inner pore walls comprising a plurality of such thiol moieties. In certain non-limiting embodiments, at least one of R and R' can be a substituted carboxy moiety. In certain such embodiments, A can be selected from alkoxycarboxyalkyl (e.g., without limitation, $C_2H_5OC(O)C(CH_3)_2$) moieties, and X can be bromide.

Regardless of polymeric structure, the terminal thiol moieties can be contacted with one or more components or reagents comprising a thiol-reactive moiety. Such components are as would be known to those skilled in the art made aware of this invention and can include, without limitation, proteins and precious metals. Accordingly, such thin film materials can be incorporated into various sensor devices for detection of such components and/or analytes, in turn, interactive therewith. Alternatively, such nano-dimensioned porous materials, whether or not contacted with a thiol-reactive moiety, can be used as templates for the fabrication of additional nano-structures.

DESCRIPTION OF THE DRAWINGS

The patent or application file contains at least one drawing executed in color. Copies of this patent or patent application publication with color drawing(s) will be provided by the Office upon request and payment of the necessary fee.

FIGS. 6 A-B. A) Absorbance spectrum for the generation of thiol functional group in the chain end of polymer P9, showing the formation of 2-pyridinethione ($\lambda_{max}$=375 nm). B) Absorbance spectrum for the formation of 2-pyridinethione ($\lambda_{max}$=375 nm) indicating that formation of block copolymer (BCP2).

FIGS. 10 A-B. A) Absorbance spectrum for the generation of thiol functional group in the chain end of polymer P10, showing the formation of 2-pyridinethione ($\lambda_{max}$=375 nm). B) Absorbance spectrum for the formation of 2-pyridinethione ($\lambda_{max}$=375 nm) indicating that formation of block copolymer (BCP3).

FIG. 11. The GPC profile of the formation of block copolymer BCP3 compared to P1 and P5.

DETAILED DESCRIPTION OF CERTAIN EMBODIMENTS

Figure 1:
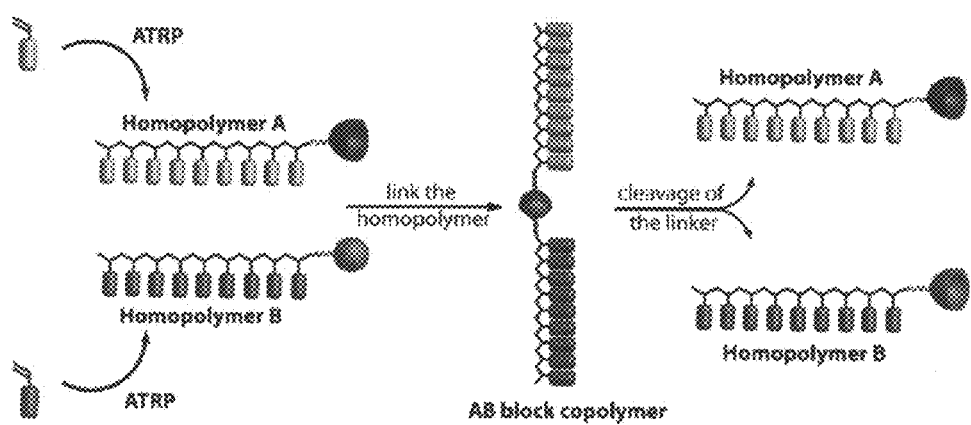
FIG. 1. Schematic of the synthetic approach towards cleavable block copolymers from the homopolymers.

The present invention is related to the synthesis of cleavable diblock copolymers from constituent homopolymers using, for example, a pyridyldisulfide functionality as a handle. The resultant block copolymer can then be linked through a disulfide functionality as the cleavable linker. Disulfides can be readily cleaved using a redox reagent such as dithiothreitol (DTT) or the tripeptide, glutathione. Such an approach is schematically represented in FIG. 1. Heterosubstituted disulfides can be obtained in high yields, as demonstrated when a molecule containing a free thiol functionality is treated with another molecule containing the pyridyldisulfide moiety. The targeted AB block copolymer, linked by a disulfide functionality, can be prepared when one of the homopolymer chains contains a pyridyldisulfide functionality while the other chain contains a free thiol unit. The thiol functionality can be introduced into the polymer chain by initially introducing it as a pyridyldisufide, then reducing it in a post-polymerization step.

Figure 2A:
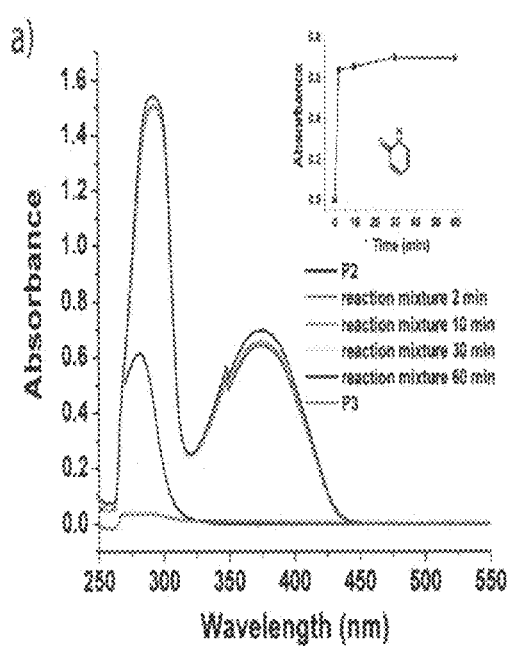
FIGS. 2A-B. A) Absorption spectra for the generation of thiol functional group in the chain end of polymer P3, showing the formation of 2-pyridothione (λmax=375 nm). B) Absorption spectra for the formation of 2-pyridothione (λmax=375 nm) indicating that formation of block copolymer (BCP1).

The synthetic approach can be illustrated with the poly(N-hydroxysuccinimidylmethacrylateb-methylmetahcrylate) (BCP1, P-NHSMA-b-MMA) in Scheme 1, below. The homopolymers (PNHSMA (P1) and PMMA (P2)) were synthesized using the initiator 1 containing the pyridyldisulfide functionality under ATRP conditions with Cu(I)Br as the metal catalyst and N,N,N',N",N"-pentamethyldiethylenetriamine (PMDETA) as the ligand (Scheme 1). Both polymers were obtained with low polydispersity (1.28 and 1.21 respectively). Since the initiator functionality contains an aromatic chromophore, its presence can be examined by UV-visible absorption spectroscopy. The intense peak at 280 nm is due to the presence of the pyridyldisulfide moiety (FIG. 2A). As mentioned above, one of the homopolymer functionality should contain a free thiol unit to achieve the targeted cleavable block copolymer. For this purpose, the disulfide moiety in polymer P2 was reduced to the thiol using dithiothreitol (DTT). This reaction here can be easily monitored using absorption spectroscopy, since the byproduct of this reaction is pyridothione, which has a distinct absorption with a $\lambda_{max}$ at 375 nm. The evolution of this peak with time was monitored and the reaction was stopped when the peak intensity did not increase further, suggesting the completion of the reaction. The resulting polymer P3 was precipitated out and the UV-Visible spectra was checked again. The absence of any peak at 280 nm confirmed the conversion of the pyridine disulfide functionality to the free thiol.

Scheme 1. Synthesis of BCP1 from its homopolymers

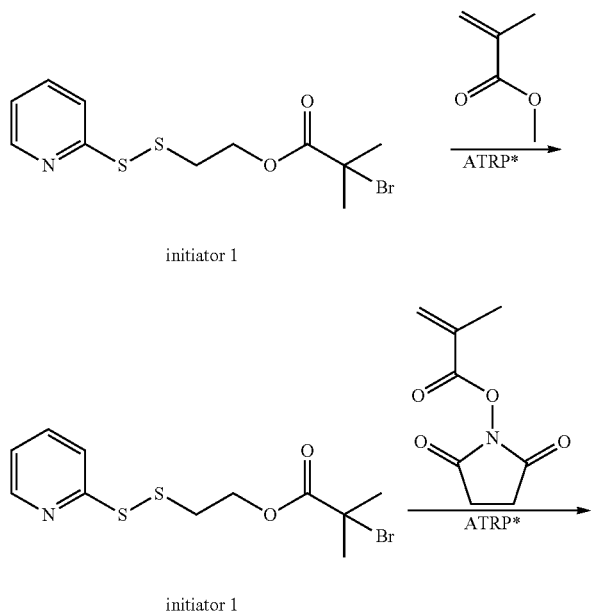

initiator 1 initiator 1

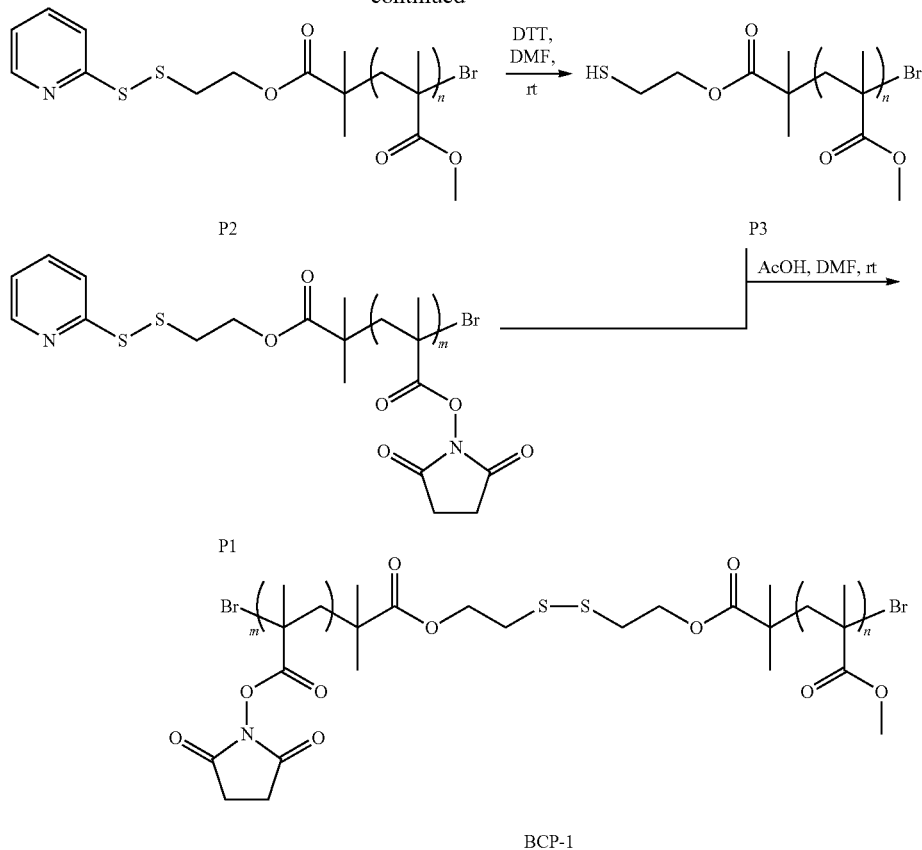

Figure 2B:
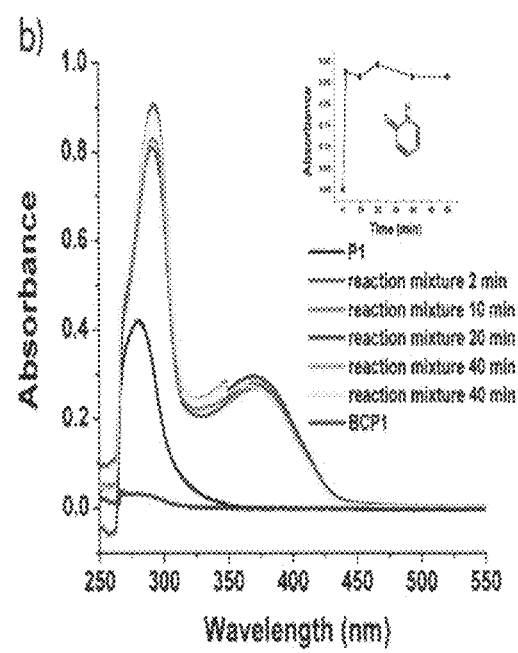
Figure 3:
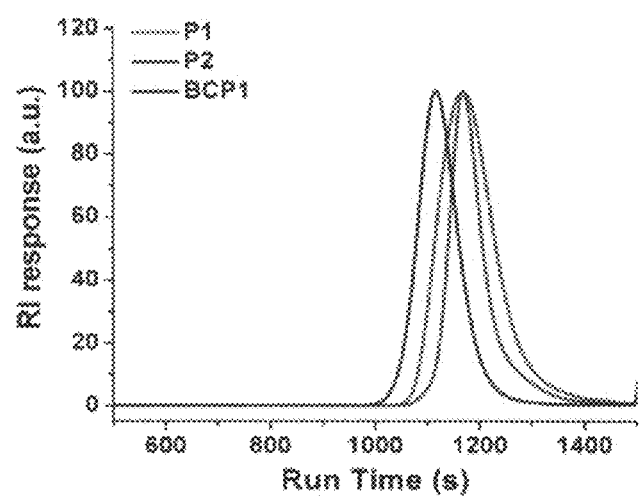
FIG. 3. The GPC profile of the formation of block copolymer BCP1 compared with P1 and P2.
Figure 4:
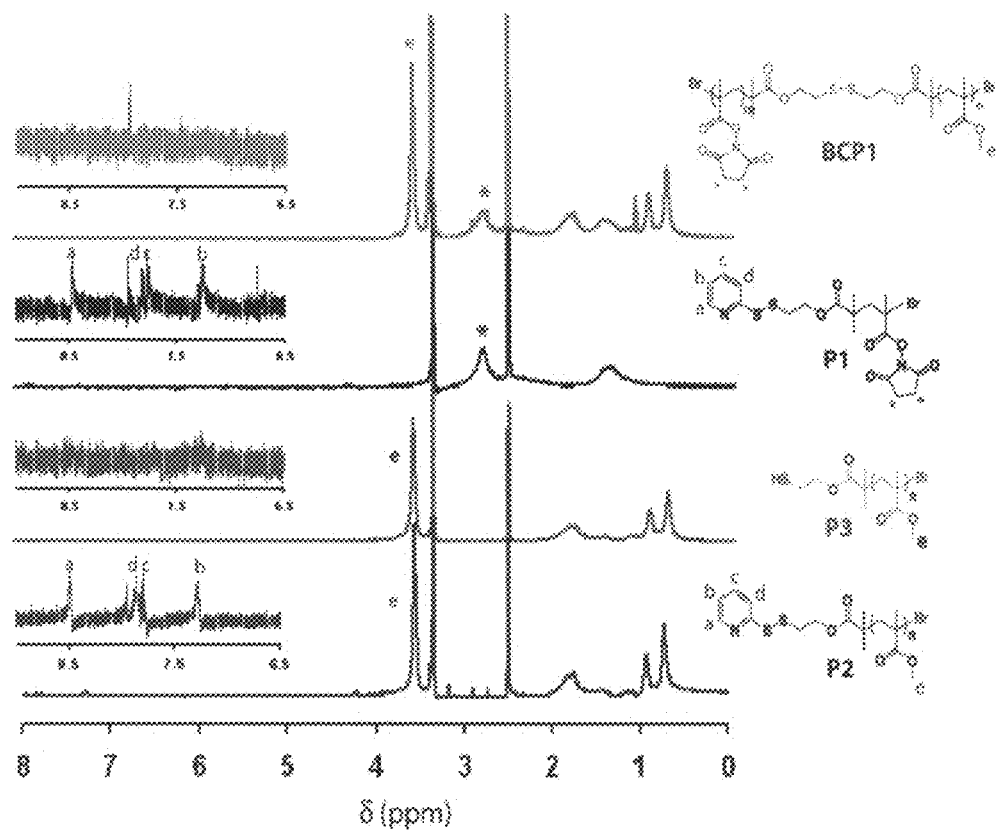
FIG. 4. $^1$H NMR stockpot of the polymer P1, P2, P3, and resulting block copolymer BCP1.

It is well known that thiols are susceptible to air oxidation; such an undesired process could cause the homodimerization of the polymer chain. In order to confirm that this did not occur in the process of isolation, the GPC of the thiol end-functionalized polymer P3 was monitored and no change in the molecular weight was observed (compared to polymer P2). Polymer P3 was then reacted with polymer P1 in presence of catalytic amount of acetic acid to achieve the block copolymer BCP1 (Scheme 1). Again, since the thiol-disulfide exchange reaction provides pyridothione as the byproduct, the formation of the block copolymer was monitored using absorption spectroscopy (FIG. 2B). Upon completion of the reaction, when the peak intensity at 375 nm remained constant, the resulting polymer was precipitated out. The GPC profile of the product block copolymer BCP1 was compared with that of P1 and P2 (FIG. 3). The GPC chromatogram of BCP1 is shifted towards a higher molecular weight compared to the parent homopolymers P1 and P2, suggesting that the targeted block copolymer has been achieved. The conclusions regarding the formation of the block copolymer using GPC and absorption spectroscopy are further supported by $^1$H NMR (see FIG. 4).

In order to test the broader applicability of the methodology introduced here, three other block copolymers BCP2-BCP4 were synthesized (Scheme 2 and Table 1). In all these cases, the polymers were obtained with low polydispersities. There are several supporting evidences to show that the block copolymers are indeed synthesized from the corresponding homopolymers using this methodology. For example, when the molecular weights of the block copolymers were estimated, these were nearly equal to the summation of that of the two parent homopolymers (Table 1). Similarly, when the $^1$H NMR of the block copolymers were examined, peaks for both the blocks were clearly visible as expected (see FIG. 4 for example). Similarly, the solubility parameters were also consistent with the formation of block copolymers. For instance, the BCP1 is soluble in acetone while P1 is not. Also, BCP1 is precipitated from ether, the solvent in which homopolymer P2 is soluble.

Scheme 2. Structure of Polymers P4-P6 and Block Copolymers BCP2-BCP4

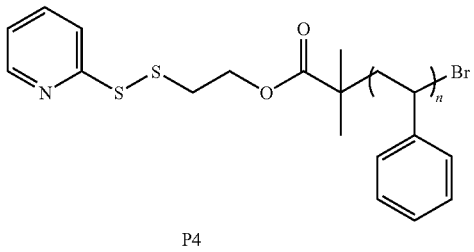

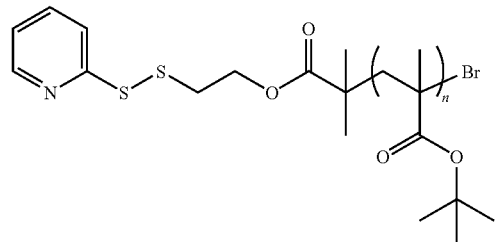

-continued
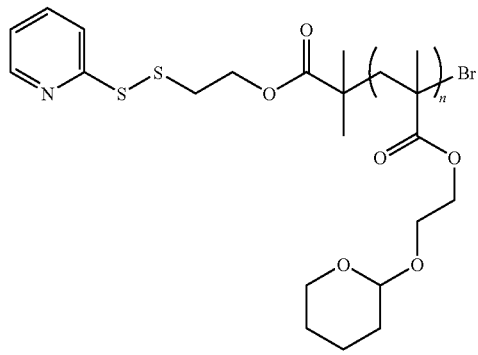
P6
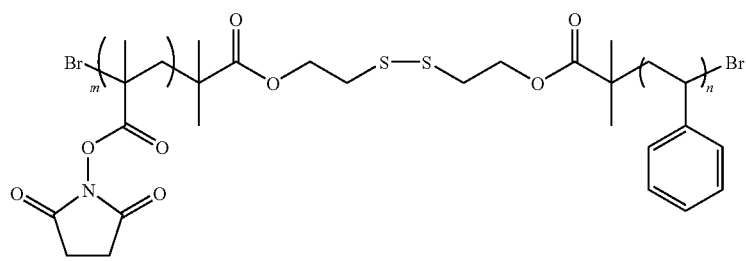
BCP2
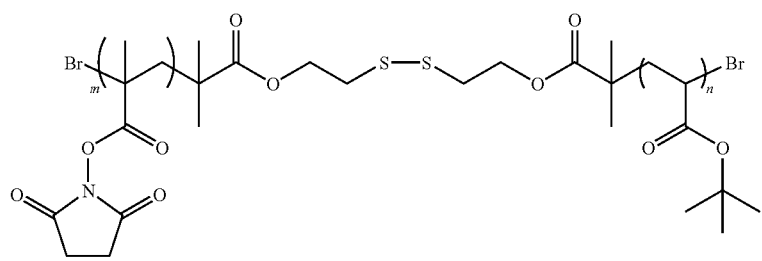
BCP3
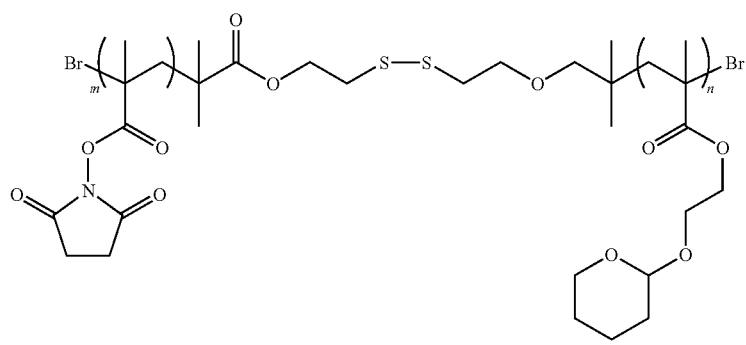
BCP4

TABLE 1

Molecular Weights and Polydispersities of the Block Copolymers BCP1-BCP4

| Block copolymer | Polymer (A + B) | | | | Mw (block copolymer) | PDI |
|---|---|---|---|---|---|---|
| | Polymer A | Mw | Polymer B | Mw | | |
| BCP1 | P1 | 9940[a] | P3 | 9640[a] | 18181[a] | 1.18 |
| BCP2[c] | P1 | 9940[a] | P4 | 5130[b] | 16540[b] | 1.16 |
| BCP3[c] | P1 | 9940[a] | P5 | 4900[a] | 14094[a] | 1.22 |
| BCP4[c] | P1 | 10640[a] | P6 | 9870[a] | 21240[a] | 1.28 |

[a]Estimated using PMMA standards;
[b]Estimated using PS standards;
[c]See supporting information for details The block copolymers BCP1-BCP4 contain NHSMA as one of the blocks, which is an activated form of the carboxylic acid functionality. It is necessary then to show that the reaction of the thiol is indeed selective to the pyridyldisulfide functionality. To ascertain this, a control experiment was conducted to treated polymer P7 with a mixture of the initiator 1 and the polymer P8. Polymer P8 contains all the functionalities present in P1 except for the disulfide initiator. The initiator 1 contains only the disulfide moiety. The product of this reaction provided only a reaction of 1 with P7 (Scheme 3). There is no evidence of any cross-polymer reaction, as confirmed using the GPC. When the GPC of the reaction mixture was examined, it was found to be exactly overlapping with that of the physical mixture of the two polymers, suggesting that there was no formation of block copolymer.

Scheme 3. Control reaction to test the selectivity of thiols towards pyridyldisulfide moiety.

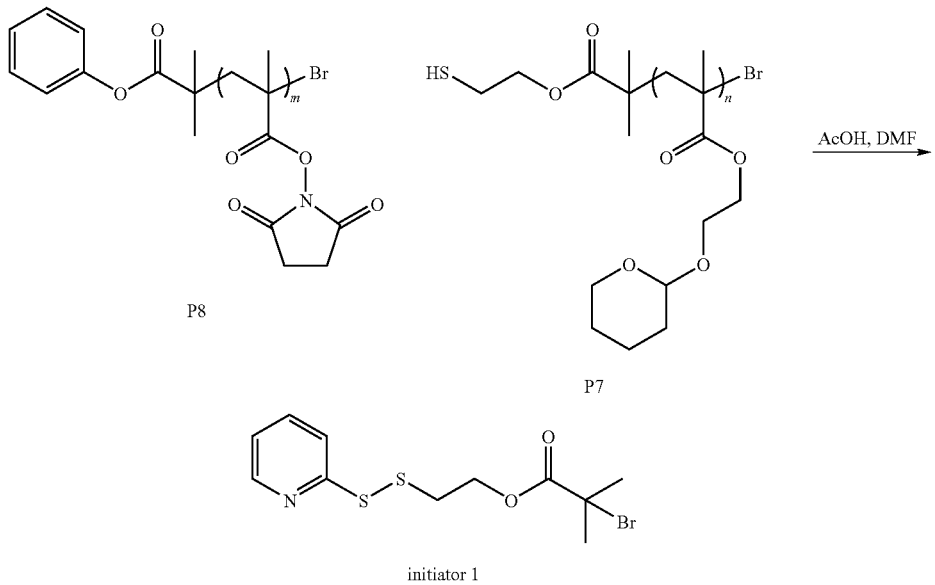

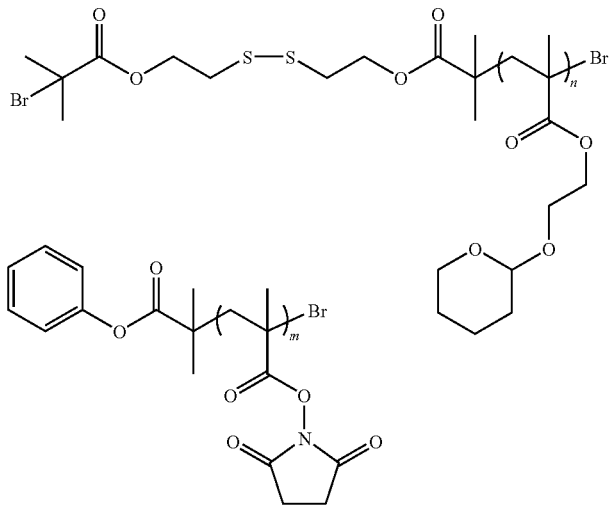

Figure 5:
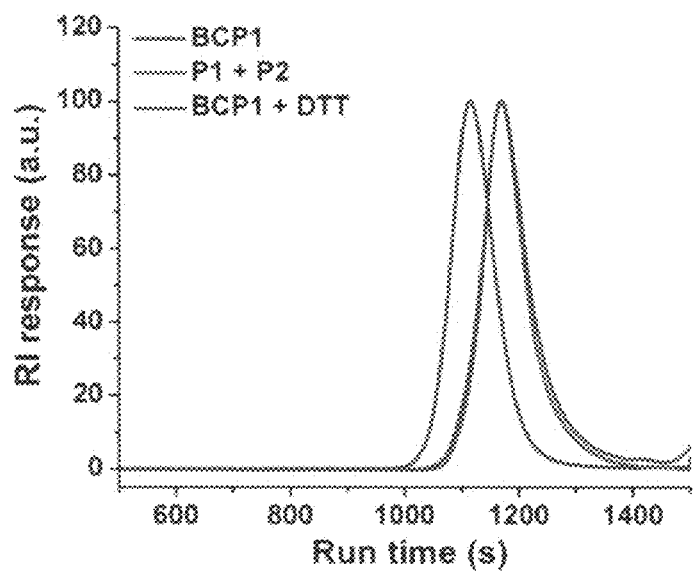
FIG. 5. The GPC profile of the cleavage of block copolymer BCP1 by DTT compared with physical mixture of P1 and P2.
Figure 7:
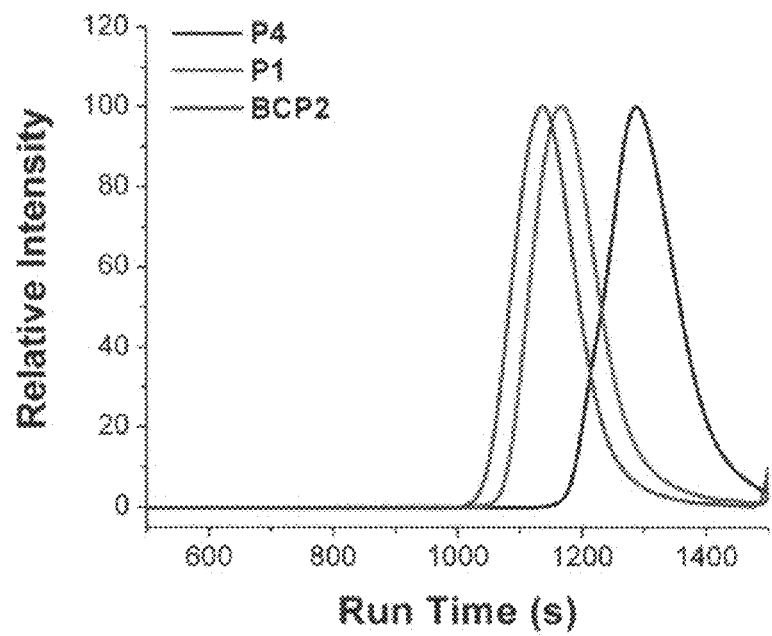
FIG. 7. The GPC profile of the formation of block copolymer BCP2 compared to P1 and P4.
Figure 8:
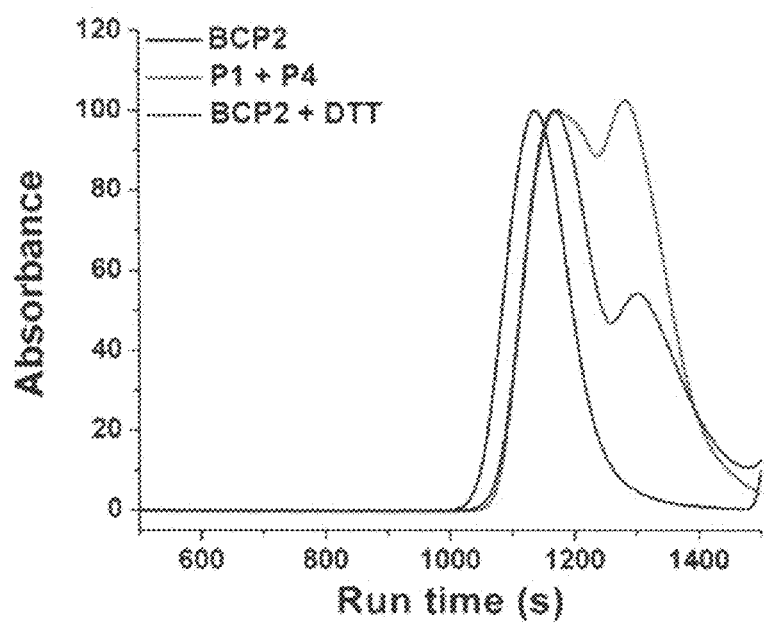
FIG. 8. The GPC profile of the cleavage of block copolymer BCP2 by DTT compared to physical mixture of P1 and P4.
Figure 9:
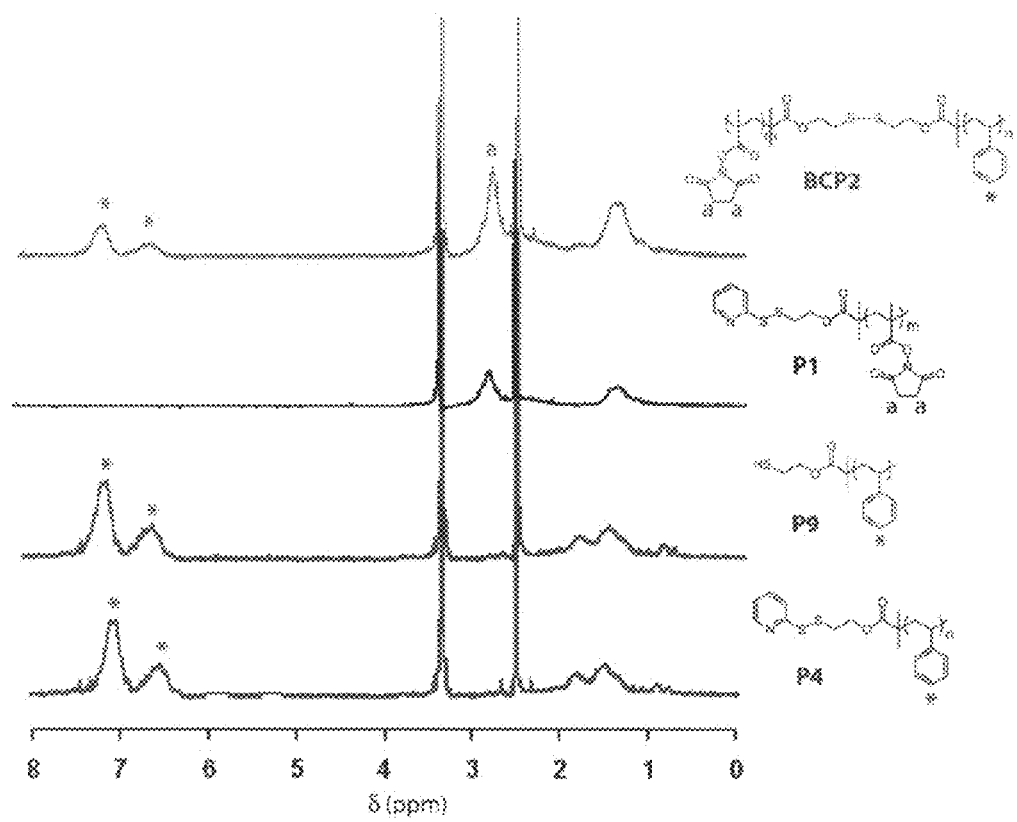
FIG. 9. $^1$H NMR spectrum of the polymer P1, P4, P9, and resulting block copolymer BCP2.
Figure 12:
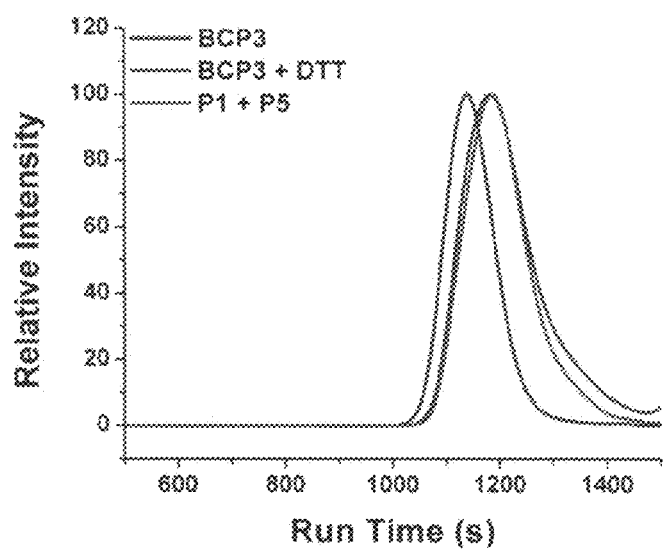
FIG. 12. The GPC profile of the cleavage of block copolymer BCP3 by DTT compared to physical mixture of P1 and P5.
Figure 13:
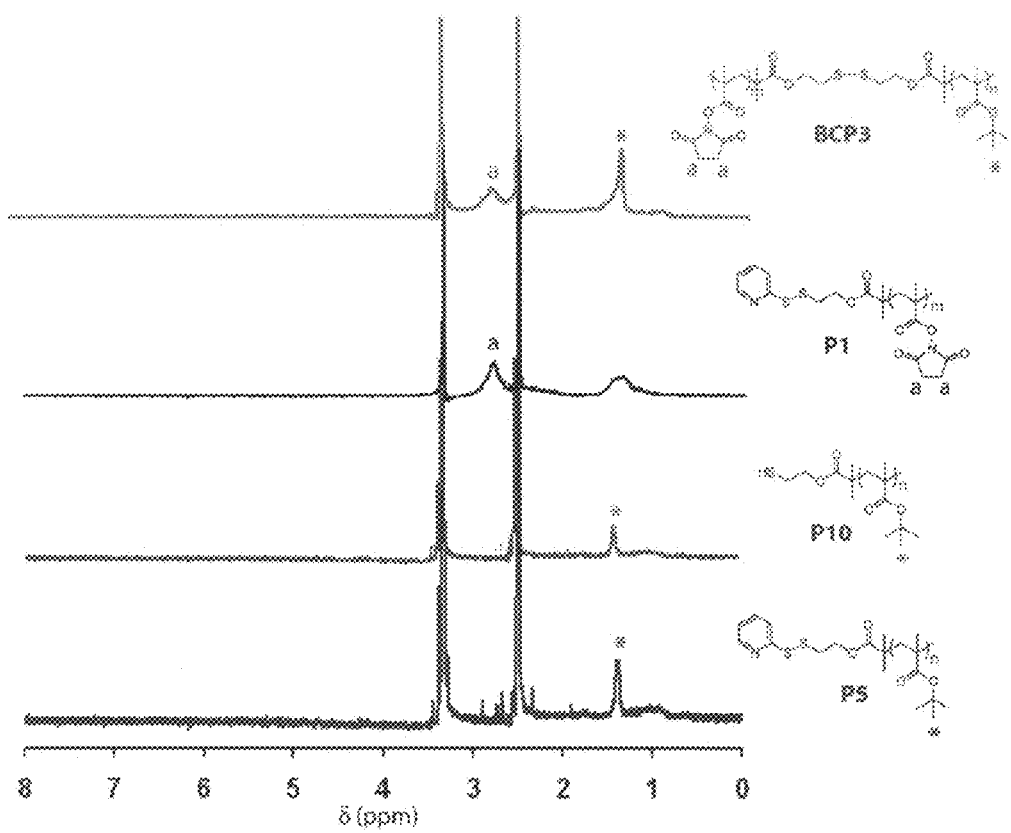
FIG. 13. $^1$H NMR spectrum of the polymer P1, P5, P10, and resulting block copolymer BCP3.
Figure 14A:
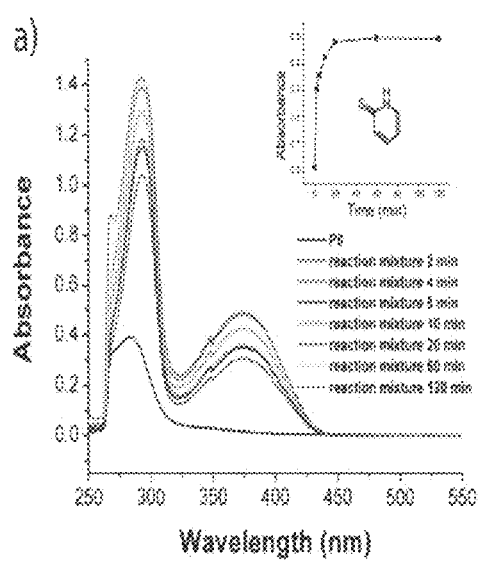
FIGS. 14 A-B. A) Absorbance spectrum for the generation of thiol functional group in the chain end of polymer P7, showing the formation of 2-pyridinethione ($\lambda_{max}$=375 nm). B) Absorbance spectrum for the formation of 2-pyridinethione ($\lambda_{max}$=375 nm) indicating that formation of block copolymer (BCP4).
Figure 14B:
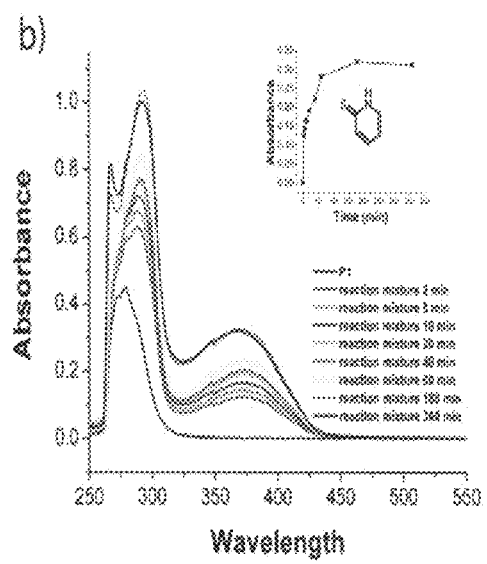
Figure 15:
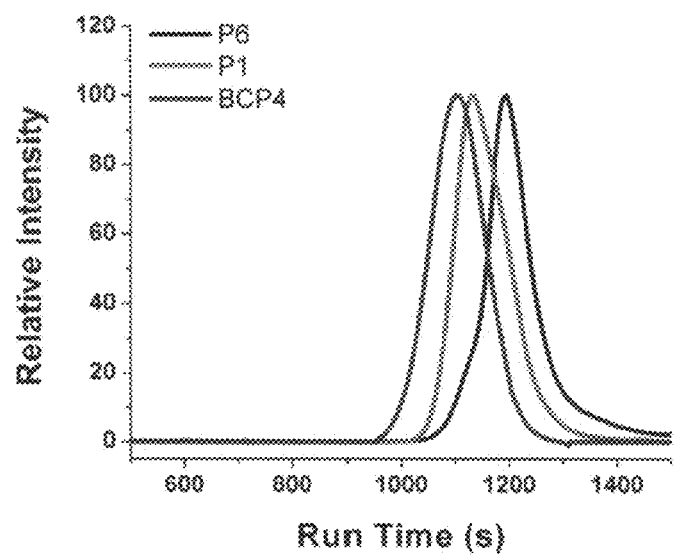
FIG. 15. The GPC profile of the formation of block copolymer BCP4 compared to P1 and P6.
Figure 16:
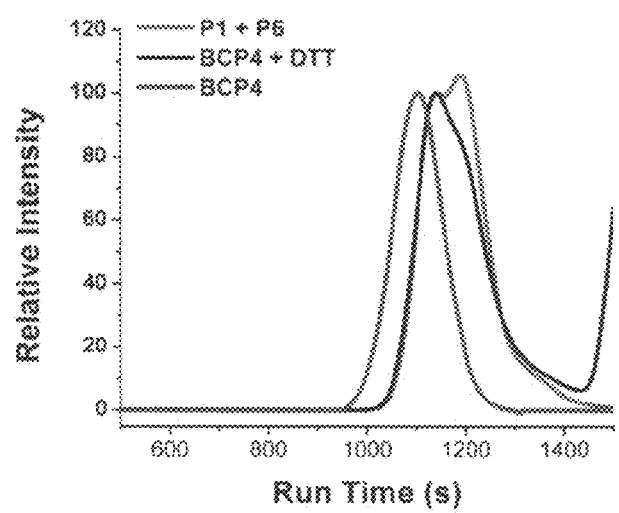
FIG. 16. The GPC profile of the cleavage of block copolymer BCP4 by DTT compared to physical mixture of P1 and P6.
Figure 17:
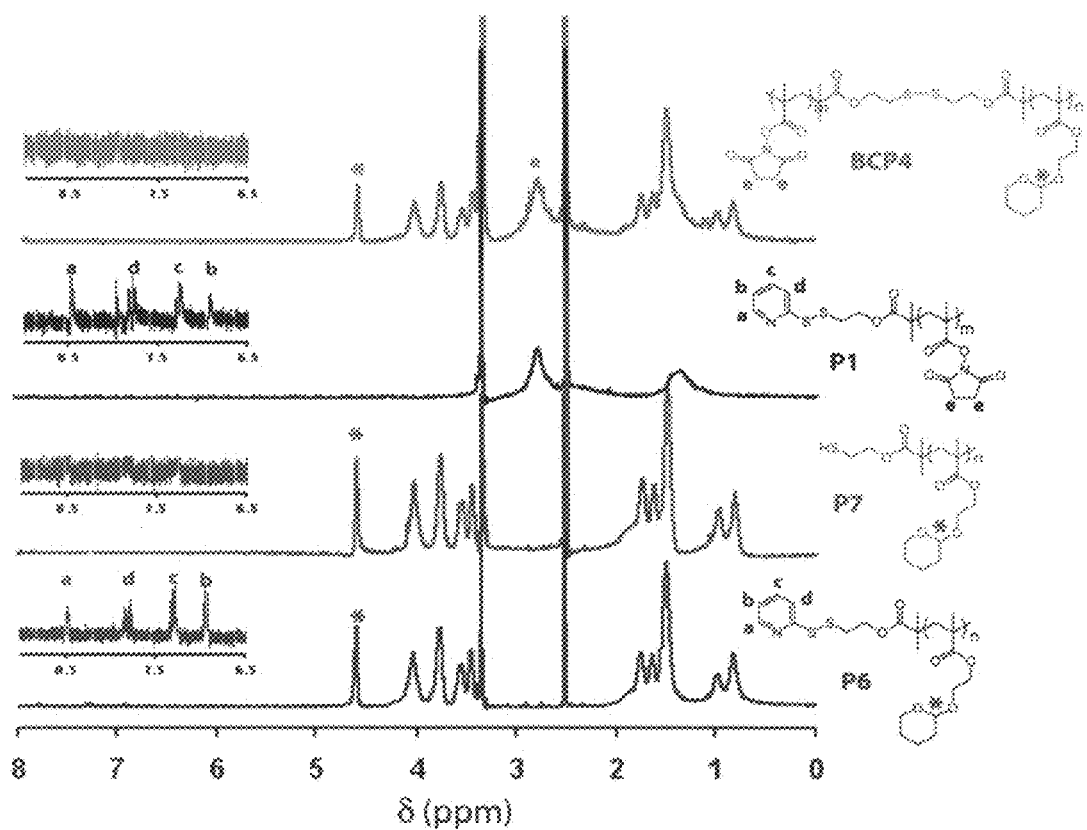
FIG. 17. $^1$H NMR spectrum of the polymer P1, P6, P7, and resulting block copolymer BCP4.
Figure 18:
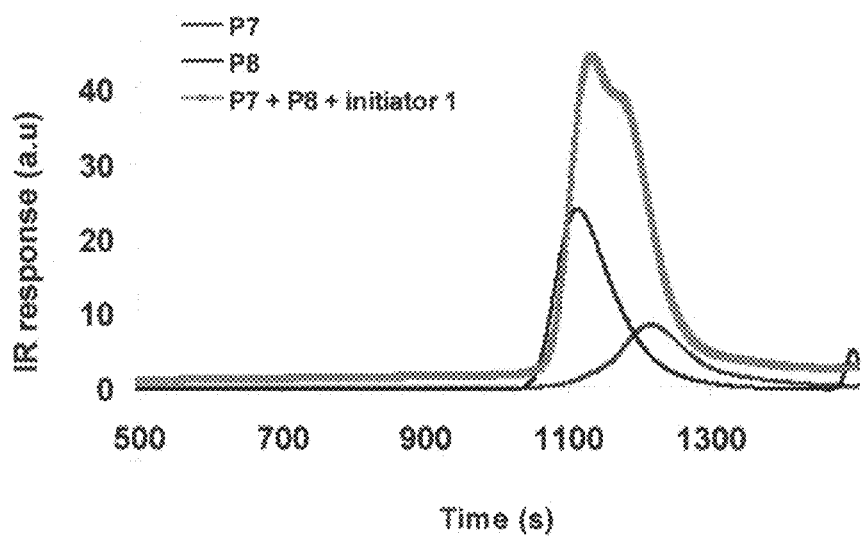
FIG. 18. The GPC profile of reaction mixture of P7, and P8 in presence of initiator 1 compared to P7 and P8 chromatograms (for the control reaction shown in Scheme 3).

To demonstrate that the block copolymers are cleavable under mild conditions, i.e., the block copolymer is indeed formed through a disulfide bond, cleavage to the constituent blocks should be possible by treating it with a mild reducing agent such as DTT. For confirmation, the block copolymer BCP1 was treated with DTT and monitored the GPC profile of the reaction mixture. The GPC chromatogram of the reaction mixture is shown with that of BCP1 and the physical mixture of P1 and P2 in FIG. 5. The GPC chromatogram of the reaction mixture matches with that of the physical mixture of the two constituent polymers indicating the cleavage of the block copolymer. This was consistently the case with all the block copolymers BCP1-BCP4, which clearly demonstrates the versatility of a strategy underlying this invention.

As discussed above, the block copolymers of this invention can be provided as thin film materials. Cleavage of the disulfide bond followed by removal of a corresponding block constituent results in the formation of nanopores in the thin film material, with generation of free thiol functional groups on the inner walls thereof. The high reactivity of such thiol groups can be employed with good effect. For example, contact with analytes interactive with such thiol groups can be used in the context of various sensing applications. Alternatively, components comprising thiol-reactive moieties can be used to introduce various other groups (e.g., without limitation, maleimide, pyridine, disulfide, etc.) to the inner pore walls for coupling and/or detection of various other components or analytes.

Accordingly, the porous materials of this invention can be used in conjunction with a range of separation media. For instance, the nanopore thiol functional groups can be modified with either hydrophobic or hydrophilic functionalities, or with functional groups such as carboxylic acids or amines, or the corresponding conjugate bases or acids thereof, or using metal ions for a range of separation applications. Depending upon thiol modification, such membranes can be used to separate various organic or bimolecular compounds based on charge and/or solubility characteristics.

Whether or not chemically modified, the thiol functional groups can also be used to interact with or immobilize proteins in the nanopores. Such interactions can be used for the separation or detection of such proteinaceous materials. Alternatively, the resulting polymer template, with protein-modified nanopores can be used in a range of biosensor and/or detection arrays or device configurations.

Related applications, using thiol-reactivity, can be directed to the fabrication of gold nano-structures within the nanopore configuration. For instance, the nanoporous thin film can be used as a template for the growth and fabrication of gold nanorods. Such thin film configurations can also be used as templates for the fabrication of various ultrahigh-density memory storage media and a range of biocomposite materials. Alternatively, a resulting thiol-gold complex can be use, as would be understood by those in the art, for a variety of biological sensing applications or in the preparation of nanostructured solar cell devices.

Figure 19:
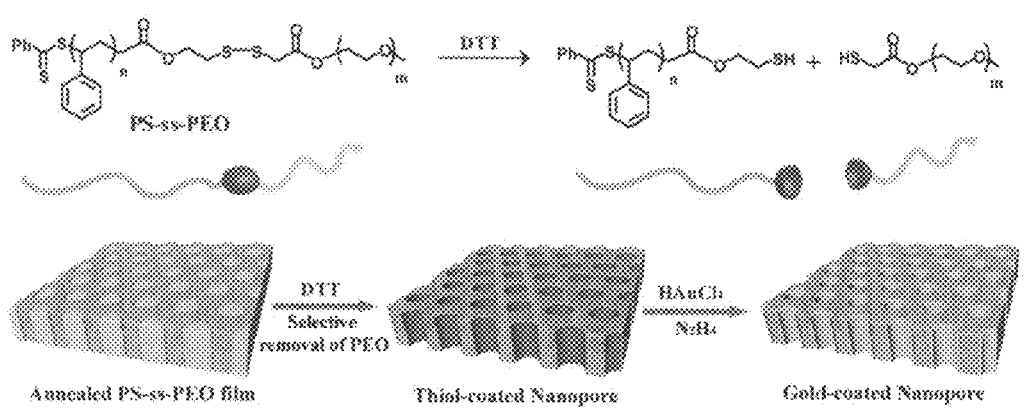
FIG. 19. A schematic representation illustrating preparation of a highly-ordered block copolymer thin film, PS-ss-PEO, PEO reduction/removal, and metal deposition into a resulting nanoporous matrix.

Illustrating such structures, a representative chemically-functionalized nanoporous film was prepared from cleavable polystyrene-block-polyethylene oxide (PS-ss-PEO), connected by disulfide bond. As discussed above, disulfides can be readily cleaved by redox stimuli such as D,L-dithiothreitol (DTT) which produces two free thiols from disulfide block copolymer with intramolecular cyclization of two thiols of DTT as a driving force. (See, Klaikherd, A.; Ghosh, S.; Thayumanavan, S. *Macromolecules* 2007, 40, 8518-852.) Accordingly, a nanoporous thin film can be generated in a simple step by immersion of PS-ss-PEO thin film in DTT-containing ethanol solution. The cleaved PEO block is dissolved in ethanol and PS block still remains on silicon surface (e.g., a substrate) without structural change because PEO, not PS, is soluble in ethanol. Therefore, a nanoporous structure with thiol-coated nanopores is generated from disulfide cleavage at the blocks interface and can be used as a scaffold to develop highly ordered polymer-gold complex array by gold-thiol interaction with the unique metal-ring structure (FIG. 19).

With reference to examples 7-13, below, the diblock copolymer PS-ss-PEO (BCP5) was synthesized by reversible addition fragmentation chain transfer (RAFT) polymerization of styrene with the PEO-RAFT macroinitiators containing disulfide bond (Scheme 4). The molecular weight of the polymer was found to be 20.2 kg mol$^{-1}$ ($M_n^{PS}$=15.2 kg mol$^{-1}$; $M_n^{PEO}$=5.0 kg mol$^{-1}$) with polydispersity of 1.30. To test the cleavage of disulfide bond under redox stimuli, the PS-ss-PEO diblock copolymer was dissolved in tetrahydrofuran and DTT was added and performed the gel permeation chromatography (GPC) experiment. The GPC trace of resultant polymer showed bimodal peaks corresponding to PS and PEO which were lower molecular weight than that of diblock copolymer, indicating that this block copolymer is cleavable under the mild condition.

Scheme 4. The synthesis of PS-ss-PEO block copolymer.

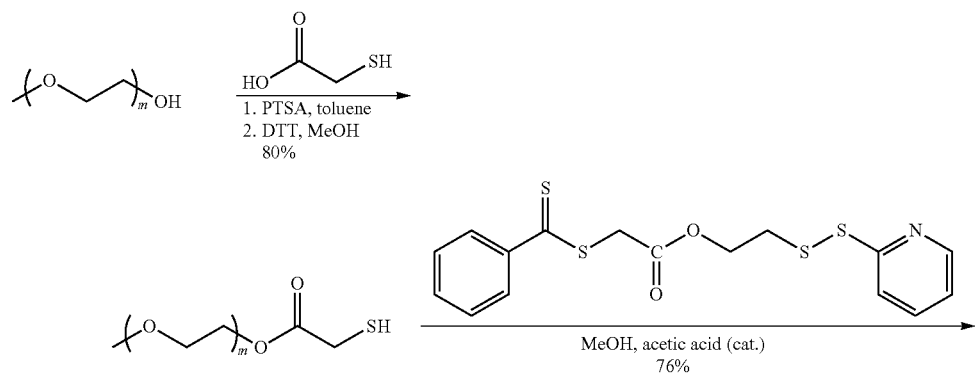

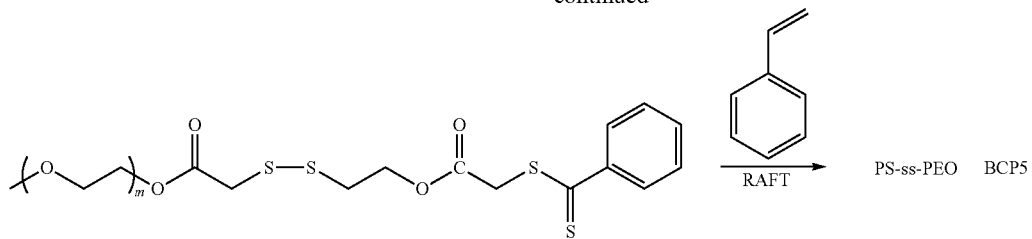

Figure 20:
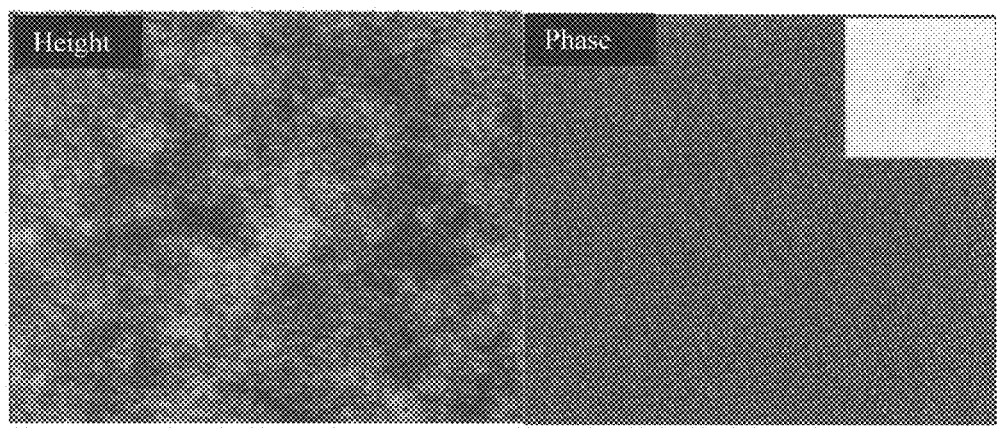
FIG. 20. AFM micrographs of a PS-ss-PEO block copolymer thin film, showing well-ordered hexagonal structure after solvent annealing. The PEO block is highly-ordered within the PS matrix, with cylindrical microdomains oriented normal to the film surface.

A 30 nm thick block copolymer thin film was prepared from spin-coating of 0.7 wt % benzene solution. Subsequently, the films are annealed in benzene and water vapor environment to orient the PEO cylindrical microdomains and enhance the lateral ordering. FIG. 20 shows a scanning force microscopy (SFM) image of highly ordered and oriented cylindrical microdomain normal to the film surface and Fourier transformation was seen in the inset, which are characteristics of long-range order as the evidence of multiple order reflection peaks with d-spacing of ~40 nm.

Figure 21:
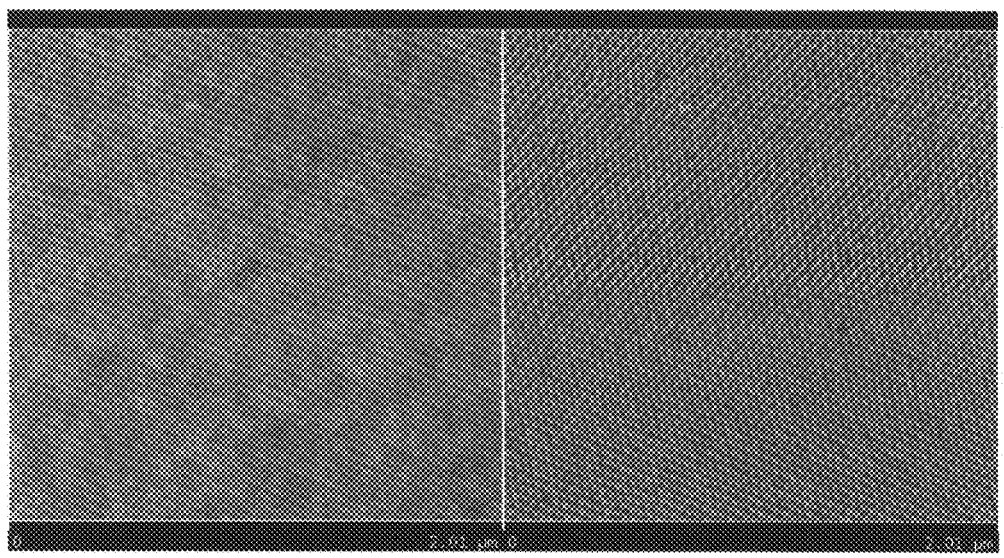
FIG. 21. AFM micrographs after disulfide cleavage showing hexagonal nanoporous structure oriented normal to the PS thin film matrix.

For selective PEO block removal, the annealed PS-ss-PEO thin film was immersed into 0.1 M solution of DTT in ethanol solution for 12 h and then washed with ethanol. Attenuated total reflection FTIR spectra (ATR-FTIR) showed that the peak corresponding to C-O stretching at 1117 cm$^{-1}$ disappeared after treating DTT solution, indicative of the removal of PEO blocks from the thin film. The SFM image of this film (FIG. 21) did not change compared to the PS-ss-PEO film, which means that this mild condition does not affect the structural morphology to generate nanoporous film. It is also confirmed by transmission electron microscopy (TEM) experiment. TEM image (not shown) showed clearly the nanoporous structure due to a big difference of electron density between pore and matrix regions even without need of any staining. An average interpore distance of ~40 nm and average pore diameter of ~20 nm was obtained. These results demonstrate that the simple and mild method, immersion of annealed PS-ss-PEO thin film into DTT solution, results in nanoporous thin film directly.

Figure 22:
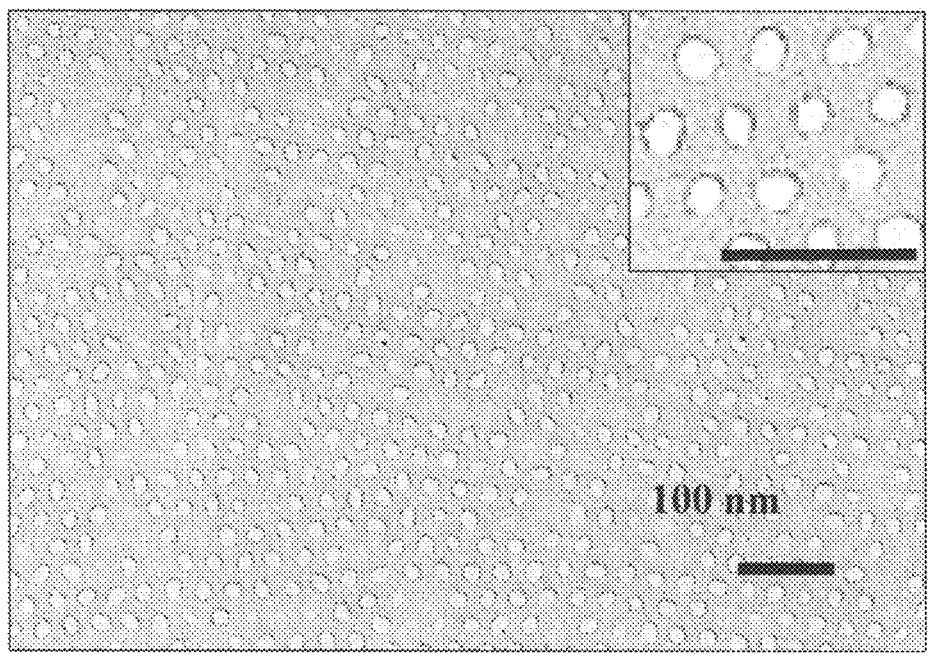
FIG. 22. TEM micrograph (left) of the nanoporous PS thin film of FIG. 21, showing the PEO block fully removed. Internal pore walls comprise free thiol groups. Immersion into a metal (e.g. Au, Ag, Co, Ni, etc.) solution, with subsequent reduction, can be used to coat or deposit the pore wall with the corresponding metal (inset, Au).

To further functionalize thiol-coated nanoporous thin film, it was immersed into metal solution and subsequently reduced the metal inside pores. It was hypothesized that metal can coat nanopores via the strong interaction between metal and thiol. For instance, when the nanoporous film was put into HAuCl$_4$ ethanol solution and the gold ion anchored in thiol groups inside the pores was reduced by hydrazine, gold was surrounded in the wall of pores with very thin thickness (FIG. 22). In contrast, addition of silver solution did not result in any ring or pore wall coating structure—but, rather nanoparticles inside the pores perhaps indicating a weaker thiol interaction with silver as opposed to gold.

The pore generation and gold loading were also investigated by grazing incidence small-angle X-ray scattering (GISAXS) experiment on thin films. While not shown, higher-order reflections and more intense peaks were clearly observed after pore generation compared to before removal of the PEO, presumably because higher-order reflections and strong intensity due to large difference of electron density of ordered structure. Further, after loading gold the thin film showed much more intense peaks due to the high electron density of gold metal. However, the primary peaks have same q value, which means that the hexagonal cylindrical morphology during overall process did not change. The lattice constants of these three films obtained from GISAXS were found to be 40.3 nm, consistent with SFM and TEM results.

As evidenced by the preceding, differential block solubilities can provide a basis for a subsequent structural, configurational, and/or compositional modification. In a similar manner, amphiphilic block copolymers have been investigated for various catalysis, nanotechnology and drug delivery systems. In particular, such amphiphilic block copolymers have generated interest because (i) they can self-assemble into various supramolecular structures and thus provide micelle-like hydrophobic interiors to encapsulate guest molecules and (ii) the release of guest molecules can be triggered by external stimuli. The self-assembly of amphiphilic molecules in aqueous media is of fundamental interest for applications in biotechnology and medicine. A number of micellar systems have been successfully developed so far. However, precise release of an encapsulated guest molecule at a specific target in a predetermined manner remains a challenging task.

During the past two decades, there have been numerous reports on stimuli-sensitive polymeric micellar systems. A majority of such systems deal with polymers which can respond to single stimulus. In nature, however, the bulk behavior of a polymer is often a result of its response not to a single factor but to multiple environmental changes. To mimic this action of nature, formulation of materials which can sense specific changes and respond to multiple stimuli in a predictable manner would be of considerable interest for a wide range of biological and/or medical applications.

Figure 23:
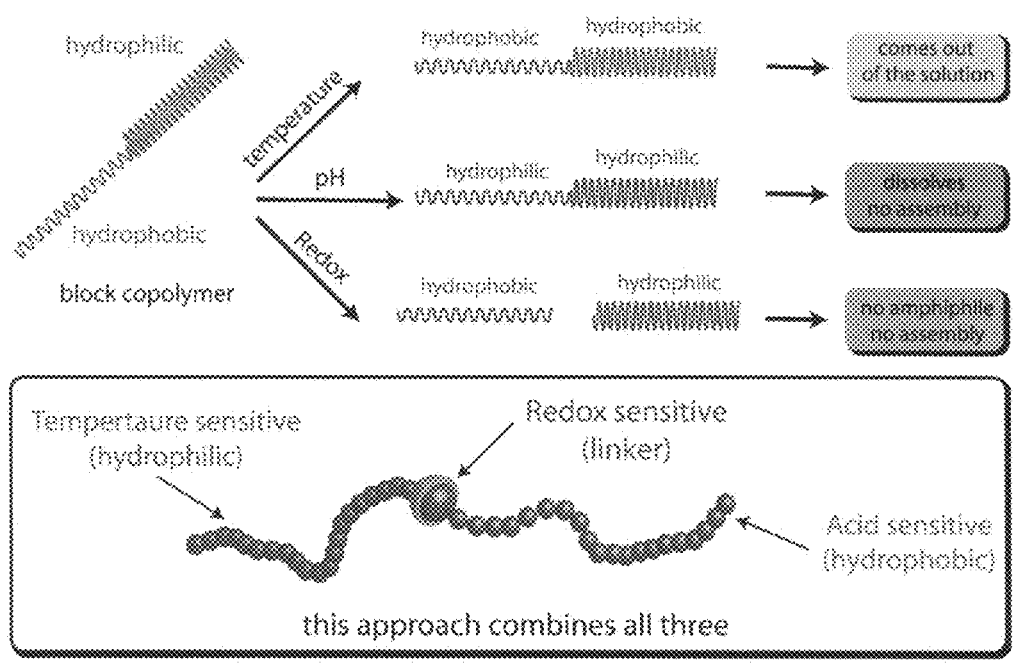
FIG. 23. Schematic representation of amphiphilic block copolymer which can respond to three stimuli; pH, temperature and/or redox.

With reference to the preceding, certain embodiments of this invention can be directed to block copolymers and corresponding micellar systems incorporating a temperature sensitive functionality on one block, an acid sensitive functionality on another block and a connection thereof via a redox sensitive disulfide linker. Such a design provides a system which can respond to independent or simultaneous changes in temperature, pH as well as redox potential (FIG. 23).

An amphiphilic block copolymer can be designed, for instance, in such a way that 1) the hydrophilic part or block is temperature sensitive 2) the hydrophobic part or block is acid sensitive and 3) the linker connecting hydrophilic and the hydrophobic blocks is redox sensitive. With reference to examples 14-18, below, the stimuli sensitive units used to illustrate such embodiments are as follows: for the temperature sensitive block part, poly (N-isopropylacrylamide) (PNIPAM) which is well known for exhibiting a reversible thermosensitive phase transition in aqueous solution was used. This block converts from hydrophilic to hydrophobic beyond its LCST (lower critical solution temperature). Acetals are commonly used to protect alcohols in organic synthesis. Simple deprotection of acetals under mild acidic conditions is well established in literature. Acetal linkages have been installed into macromolecule such as polymers and dendrimers and were successfully cleaved under mild acidic conditions. 2-Hydroxyethyl methacrylate (HEMA) was used as another monomer, and the alcohol group of HEMA was protected using dihydropyran (THP). The polymer based on THP protected HEMA is hydrophobic and would be converted to hydrophilic block after acid hydrolysis of the acetal protecting group (Scheme 5). The homopolymer blocks are linked by a redox sensitive disulfide functionality, as discussed above; that is, the block copolymer can be easily cleaved into its constituent homopolymers using DTT.

Figure 24A:
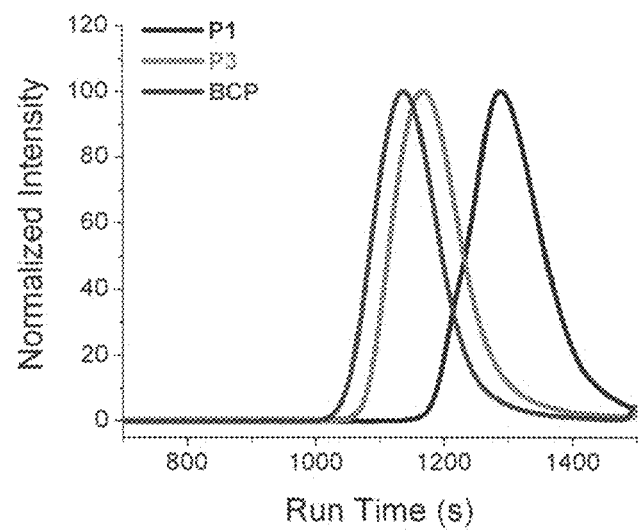
FIGS. 24 A-B. Characterization of block copolymer BCP (A) the GPC profile showing the formation of block copolymer BCP (B) $^1$H NMR of BCP and its homopolymers.
Figure 24B:
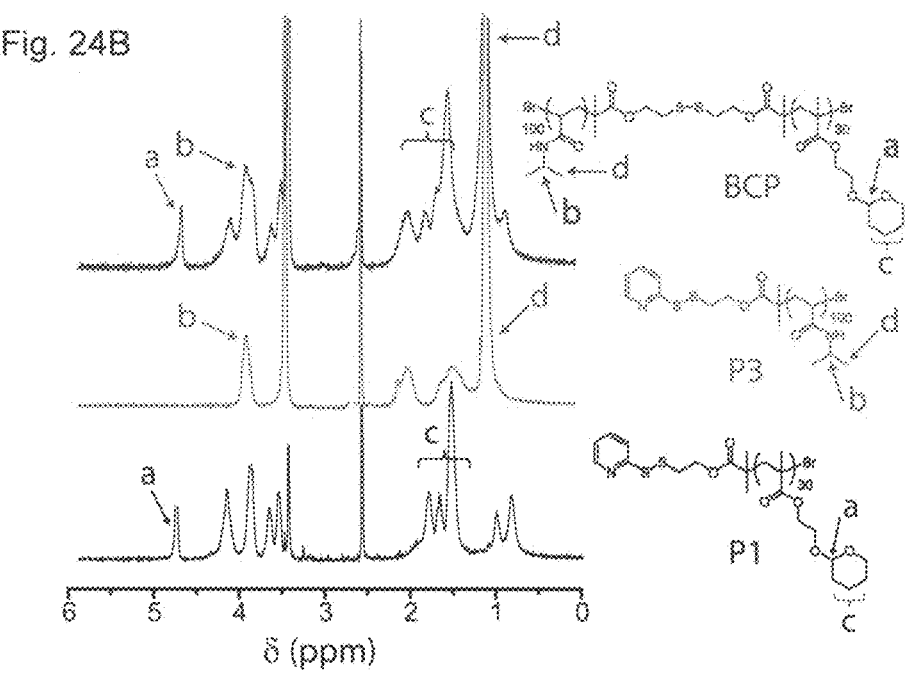

THP protected HEMA monomer and NIPAM were polymerized using initiator 1 by ATRP. Both homopolymers were obtained with low polydispersity and with molecular weights (Mn) of 6400 g/mol and 11300 g/mol, respectively (Table 3). In order to obtain polymer P14 with a free thiol, polymer P13 was reduced using dithiothreitol (DTT). Finally, polymer P15 was coupled with polymer P14 to achieve the block copolymer, BCP6 (Scheme 5). The molecular weights of P13, P15 and BCP6 were determined by GPC (DMF) using PMMA standards (FIG. 24A). The molecular weight of the resulting block copolymer is nearly equal to the sum of the constituent homopolymers (Table 3). Moreover, in GPC the peak corresponding to BCP6 is shifted towards a higher molecular weight compared to P13 and P15, indicating that the targeted block copolymer is indeed achieved (FIG. 24A). The above observations are further supported by $^1$H NMR (FIG. 24B).

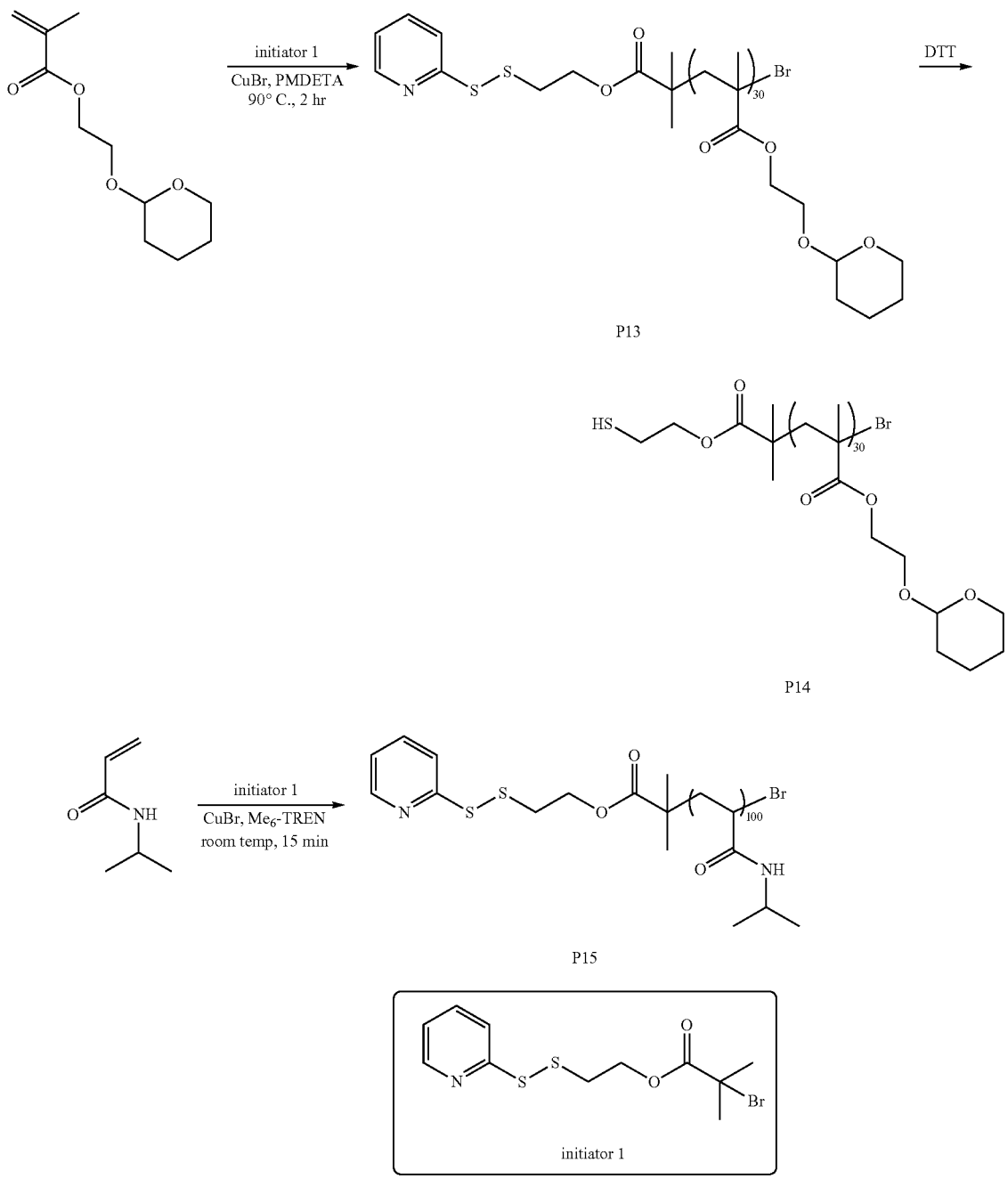

-continued

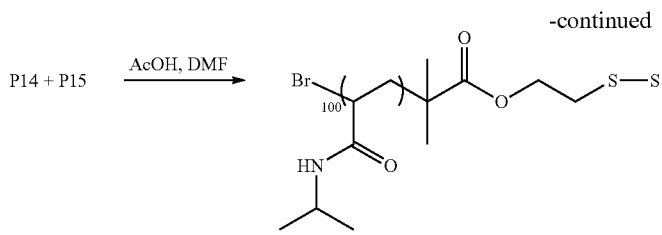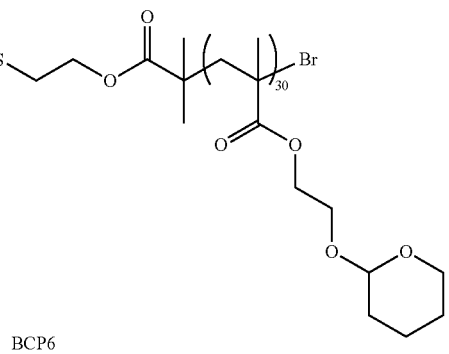

BCP6

TABLE 3

Properties of polymers

| Polymer | Mn* | PDI* | yield |
|---|---|---|---|
| P13 | 6400 | 1.13 | 76% |
| P14 | 6230 | 1.10 | 84% |
| P15 | 11300 | 1.24 | 89% |
| BCP6 | 17400 | 1.15 | 63% |

*estimated by GPC (DMF) using PMMA standard.

Figure 25A:
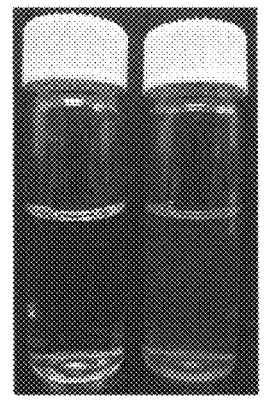
FIGS. 25 A-B-C. Micellar assembly (A) Photograph shows an aqueous solution of BCP; (left) before adding Nile red, (right) after adding Nile red. (B) Plot of fluorescence intensity of Nile red vs concentration of BCP. (C) Size of the micelle at 0.2 mg/mL determined by DLS experiment.
Figure 25A:
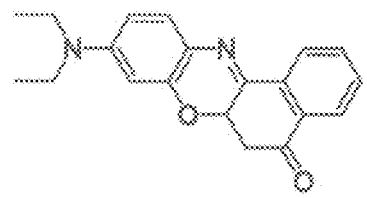
Figure 25B:
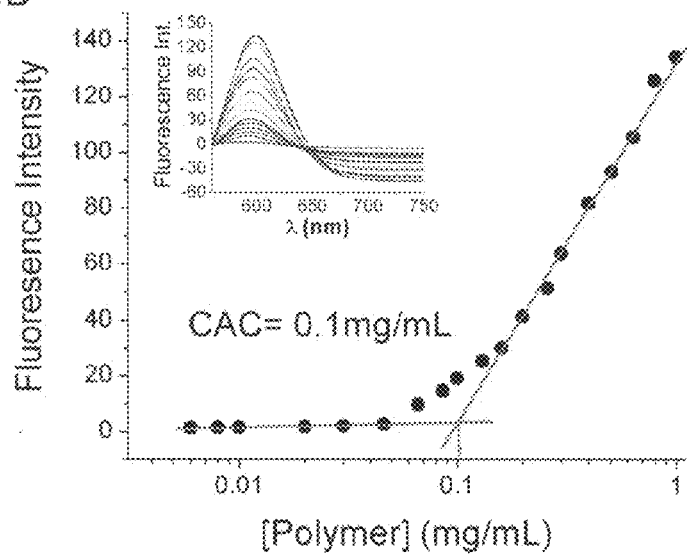
Figure 25C:
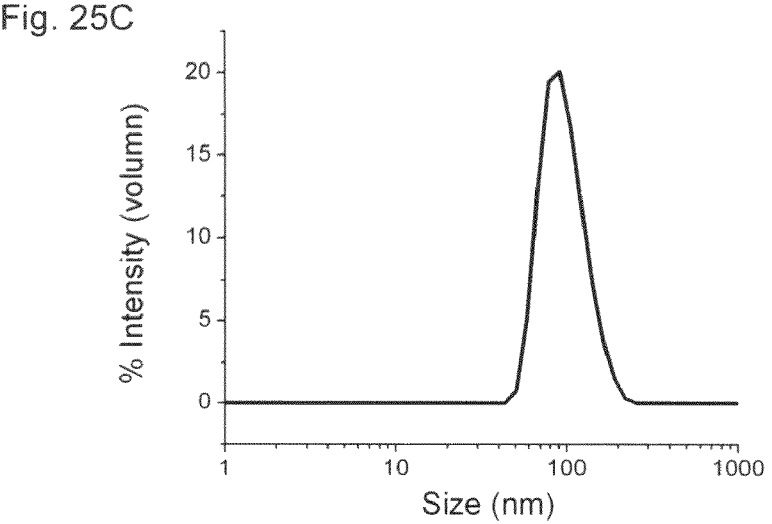

Critical aggregation concentration (CAC) of the block copolymer was determined at pH 7.4 using the fluorescence probe technique. Nile red is a hydrophobic dye which by itself is not soluble in water, as can be discerned from the lack of absorption or emission spectral intensity from its aqueous solution. However, this dye can be sequestered inside the hydrophobic pocket generated by micelles. To obtain the CAC of BCP6, the aqueous solution of BCP6 was prepared by dialysis method and Nile red was encapsulated into the hydrophobic micellar interior (FIG. 25A). The concentration of BCP6 was varied and the change in the relative emission intensity of Nile red was plotted. A sudden decrease in emission intensity was observed at a concentration of about 0.1 mg/L of BCP6, indicating the onset of micelle formation (FIG. 25B). Dynamic light scattering (DLS) experiments were carried out to further verify micelle formation. The BCP6 solution (0.2 mg/mL, above the CMC) was prepared and the hydrodynamic radius of the micelle was determined. An average size of about 90 nm was obtained with excellent correlation function (FIG. 25C), suggesting that BCP6 indeed aggregated to form micelle in water.

Figure 26A:
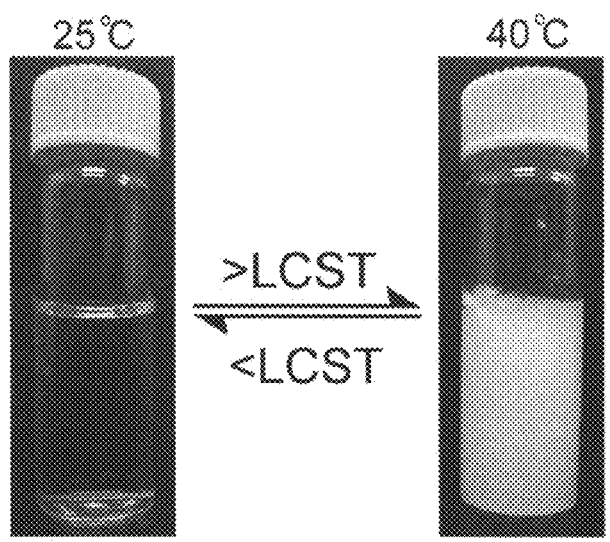
FIGS. 26 A-B. Temperature sensitivity of BCP (A) photograph showing an aqueous solution of BCP; left-at room temperature, right-after heating to 40° C., (B) Turbidity experiment showing the change in HT voltage with temperature of BCP and PNIPAM.

It is well known that the PNIPAM and copolymer of NIPAM can swell or collapse suddenly upon small temperature changes below and above the LCST. This swelling behavior is dependent upon the degree of hydration of PNIPAM with water. It is suggested that the degree of hydration of PNIPAM reduces with increasing temperature resulting in precipitation of the polymer. The polymeric micelle is comprised of acetal hydrophobic part and PNIPAM hydrophilic part. The hydrophobic part is presented in the concave interior of the micelle, while the hydrophilic part is at the convex exterior. To test its thermo-sensitive behavior, a solution of BCP6 was heated up to 40° C. The formation of precipitate was observed with increase in temperature, and this process is thermally reversible (FIG. 26A), indicating that the BCP6 does exhibit the LCST behavior.

Figure 26B:
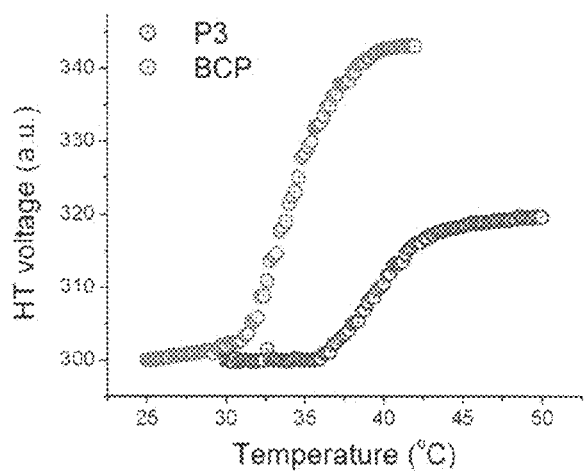

To determine the LCST of the BCP6, a turbidity experiment was carried out using Circular Dichroism (CD) spectrophotometer at different temperatures. BCP6 (1.4 mg/mL) solution was prepared and the change in the high tension (HT) voltage was monitored at 600 nm by varying the temperature by 1° C./min. The LCST of BCP6 was found to be around 35° C. (FIG. 26B). It is known that the copolymerization of NIPAM with hydrophobic comonomer would decrease the LCST, while the hydrophilic comonomers have the opposite effect. BCP6 is comprised of a hydrophilic PNIPAM (P15) and hydrophobic THP protected HEMA (P 14). Hence, the LCST of the BCP6 is expected to be lower than that of PNIPAM (P15). To verify this, the LCST of the PNIPAM homopolymer of same weight percentage (1.4 mg/mL) was determined and compared with that of BCP6. The LCST of PNIPAM was found to be about 40° C., which corroborates the fact that hydrophobic comonomer decreases the LCST of PNIPAM.

Figure 27A:
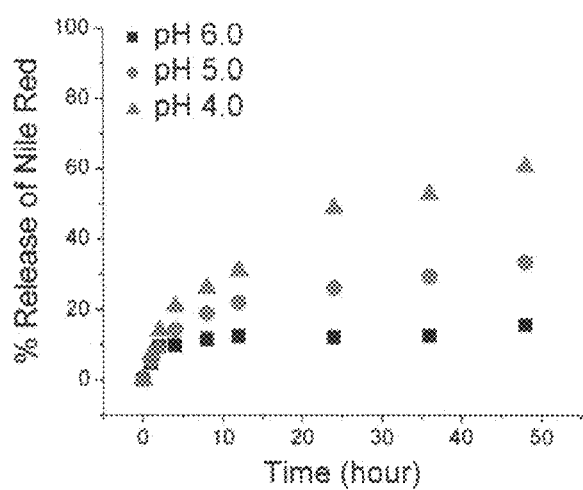
FIGS. 27 A-B-C. Acid sensitivity of BCP (A) pH dependent release of Nile red from micellar assembly, (B) Time dependent DLS profile of BCP solution in sodium acetate buffer of pH 4.0 (50 mM), (C) $^1$H NMR of BCP before and after treatment with sodium acetate buffer of pH 4.0 (50 mM).
Figure 27B:
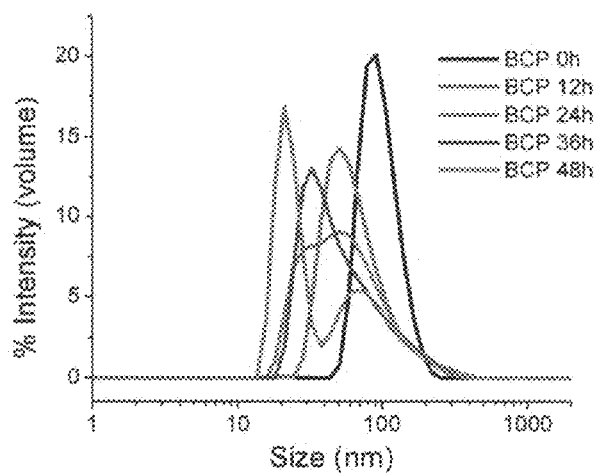

As mentioned earlier (e.g., Scheme 5), the hydrophobic part of BCP6 provides an acid sensitive cyclic acetal functionality, which can be cleaved under mild acidic conditions. Upon cleavage of the acetal group, the hydrophobic part of the block would transform into hydrophilic PHEMA, creating an imbalance in the hydrophobic/hydrophilic ratio which would result in the disruption of the micelle. In order to examine if the micelle is indeed sensitive to variations in pH, the BCP6 solution (0.2 mg/mL, well above the CAC) was used to encapsulate Nile red, and this solution was treated with 50 mM sodium acetate buffer (pH varying from 4.0, 5.0, and 6.0). The release of Nile red from the micellar interior was monitored as a function of time and is depicted in FIG. 27A. Slow release of Nile red, up to 20% was observed at pH 6.0, while the release rate increased with decrease in pH from 5.0 to 4.0. Up to 60% of Nile red was released at pH 4.0 in 2 days in contrast to that of 20% at pH 6.0, suggesting faster cleavage kinetics of acetal at low pH with concomitant disassembly of micelle. To further confirm the fact that the reduction in pH would result in the disassembly of micelle, DLS experiment was carried out. The BCP6 solution (0.2 mg/ml) was treated with sodium acetate buffer of pH 4.0 (50 mM) and the size of the micellar assembly was monitored for 2 days. As indicated in FIG. 27B, the size of the micelle indeed reduces from 90 nm to 30 nm in 2 days, suggesting the disassembly of the micelle.

Figure 27C:
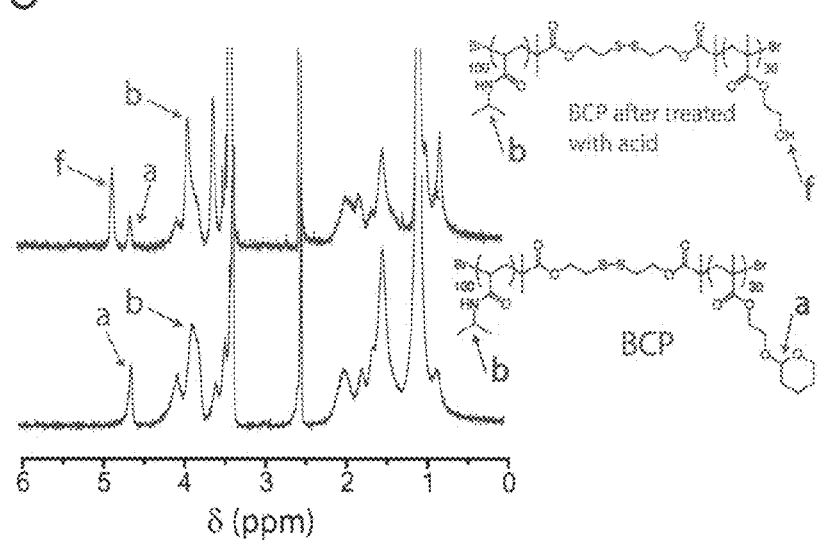

To further investigate hydrolysis of the BCP acetal moiety and micelle disassembly, the BCP6 solution was treated with sodium acetate buffer of pH 4 (50 mM) and incubated at room temperature for 2 days. The resulting solution was then dialyzed and lyophilized to remove the byproduct, 2-hydroxytetrahydropyran, which is generated due to the cleavage of acetal. The $^1$H NMR spectra of the BCP before and after treatment with acid were recorded (FIG. 27C). It can be observed from the $^1$H NMR data that the acetal proton of BCP appears at 4.6 ppm. After treatment with acid, the intensity of the acetal peak was reduced and a new peak was observed at 4.8 ppm, which corresponds to the —OH group of poly (2-hydroxyethyl methacrylate) (PHEMA), suggesting that the acetal was indeed accessible to acid.

Figure 28A:
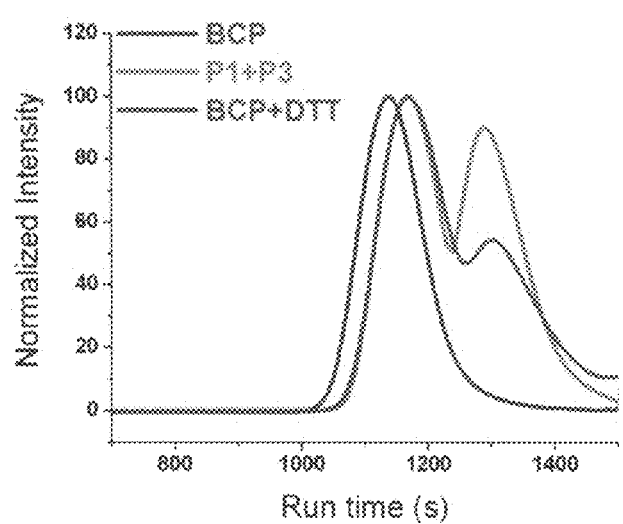
FIGS. 28 A-B-C and Redox sensitivity of BCP (A) GPC profile of BCP compared with the BCP solution treated with DTT and physical mixture of P1 and P3, (B) turbidity of micellar solution upon treatment with DTT, (C) % release of Nile red from micellar interior.

As discussed, the hydrophobic and the hydrophilic blocks of BCP6 are linked by a disulfide bond. Treatment of BCP solution with a reducing agent should cleave the BCP into two separate homopolymers, the water soluble PNIPAM and a non-soluble THP-protected HEMA, disrupt the micelle and release the host molecules. To demonstrate sensitivity to changes in reduction potential, BCP6 (0.2 mg/mL) was dissolved in DMF, a good solvent for both parts of the copolymer, and treated with DTT (5 mg/mL) for 30 min. The GPC of the reaction mixture before and after addition of DTT were recorded (FIG. 28A). The GPC of the physical mixture of polymers P13 and P15 is also shown in FIG. 28A. The GPC profile of the reaction mixture after treatment with DTT matches with that of the physical mixture of the two constituent polymers, indicating the complete cleavage of the BCP.

Figure 28B:
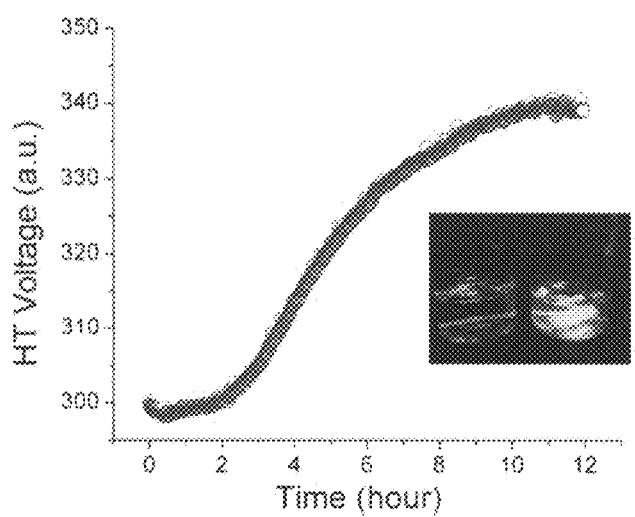

Disruption of the disulfide linkage by DTT should result in an insoluble hydrophobic compound and an increase in the turbidity of the solution. To confirm, the turbidity of an aqueous solution of BCP6 (0.2 mg/mL) in presence of DTT (5 mg/mL) was measured using a CD spectrophotometer. The change in HT voltage was measured over time (FIG. 28B). The turbidity was found to increase with time, suggesting that the disulfide bond in a polymeric micelle is accessible to a hydrophilic reducing agent.

Figure 28C:
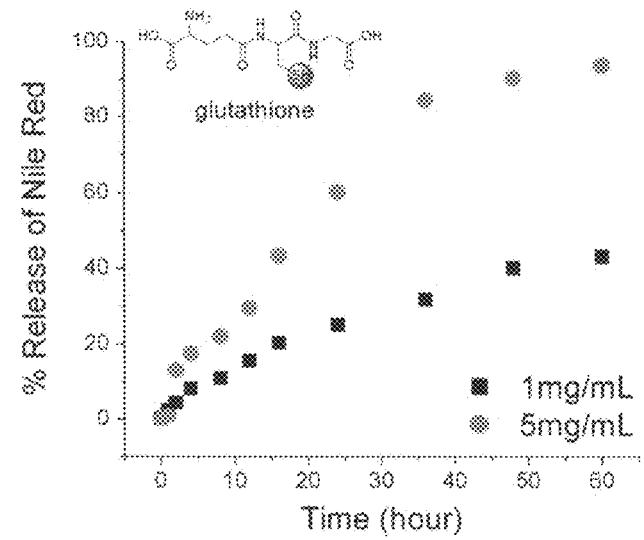

However, in most mammals, glutathione is an abundant intracellular reducing agent, with concentrations as high as 10 mM in most cell types and in the micromolar range for blood plasma. Micelle disassembly in presence of glutathione was demonstrated via emission spectrum. Nile red was encapsulated into the BCP6 micelle and treated with glutathione (1 mg/mL and 5 mg/mL, respectively). The percent release of Nile red with the progress of time was monitored (FIG. 28C). The release of Nile red increased with time, suggesting the disassembly of the polymeric micelles. At a concentration of 1 mg/mL glutathione, 40% of Nile red was released in 3 days, while 100% release of Nile red was obtained at higher glutathione concentration (5 mg/mL) over the same period of time (FIG. 28C).

Even though the responsiveness of the micelle to pH, temperature and redox potential has been demonstrated independently, a combination of two or more stimuli in one system would provide a unique opportunity to fine tune the release kinetics of guest molecules. Accordingly, the responsiveness of the BCP6 polymer micelle for the following stimuli combinations: (i) Temperature and redox potential (ii) Temperature and pH (iii) pH and redox potential (iv) pH, temperature and redox potential.

Figure 29A:
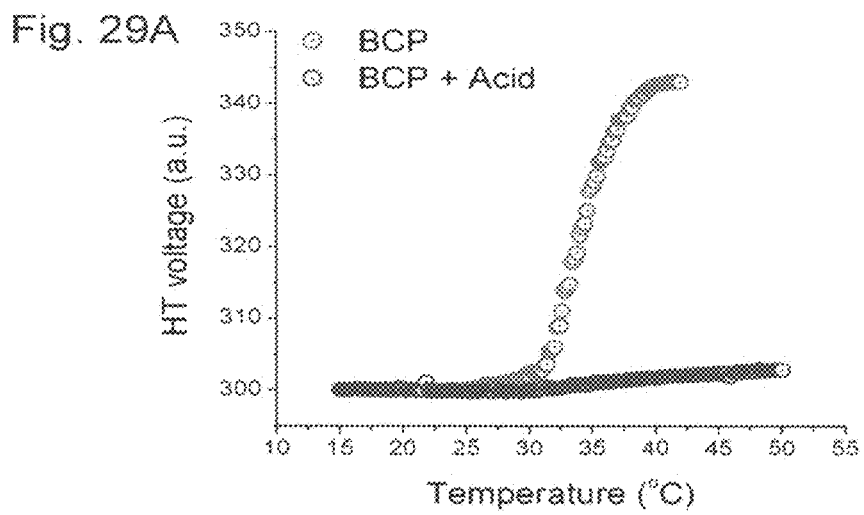
FIGS. 29 A-B-C-D. Dual stimuli responsive micelle (A) Temperature-acid sensitive, (B) Temperature-redox sensitive, (C) % release of Nile red from BCP solution treated with sodium acetate buffer of pH 5.0 (50 mM) and Glutathione (1 mg/mL) (D) Time dependent DLS profile of BCP solution in sodium acetate buffer of pH 5.0 (50 mM) and Glutathione 1 mg/mL.
Figure 29B:
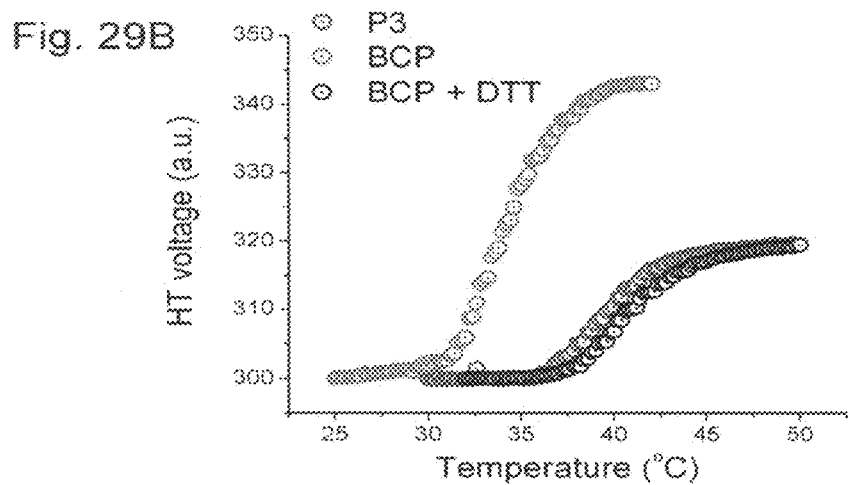

To study the effect of pH and temperature, the BCP (0.2 mg/mL) solution was treated with sodium acetate buffer pH 4.0 (50 mM) and incubated at room temperature for 2 days. The solution was filtered and the LCST was measured by monitoring the HT voltage using CD spectrophotometry. The BCP solution after treatment with acid did not exhibit phase transition (FIG. 29A). A controlled experiment was performed by measuring the LCST of PNIPAM with acid (10% v/v) to study if acid has any effect on the LCST of PNIPAM: the acid was found to have no effect on the LCST of PNIPAM.

To study the effect of temperature and redox potential, a BCP (0.2 mg/mL) solution was treated with DTT (5 mg/mL) and incubated at room temperature for 2 days. After incubation, the BCP solution turned turbid, suggesting that the disulfide bond was cleaved by DTT. The solution was then filtered to remove the insoluble particles and LCST of the filtrate was determined by monitoring the HT voltage using CD spectrometer (FIG. 29A). Treatment of BCP solution with DTT should result in a mixture of PNIPAM (P15) and THP-protected HEMA (P13). P13 is not soluble in water the filtrate should contain only PNIPAM, and the observed LCST should resemble that of PNIPAM. As can be seen from FIG. 29A, the LCST of the filtrate matches exactly with that of PNIPAM (same weight percentage), suggesting the complete disruption of disulfide bonds.

Figure 29C:
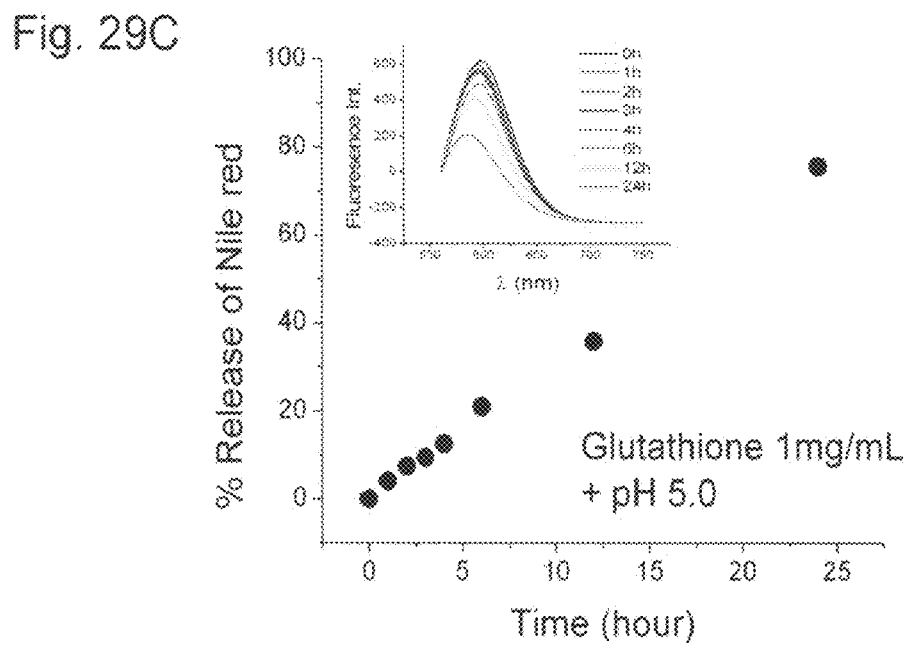
Figure 29D:
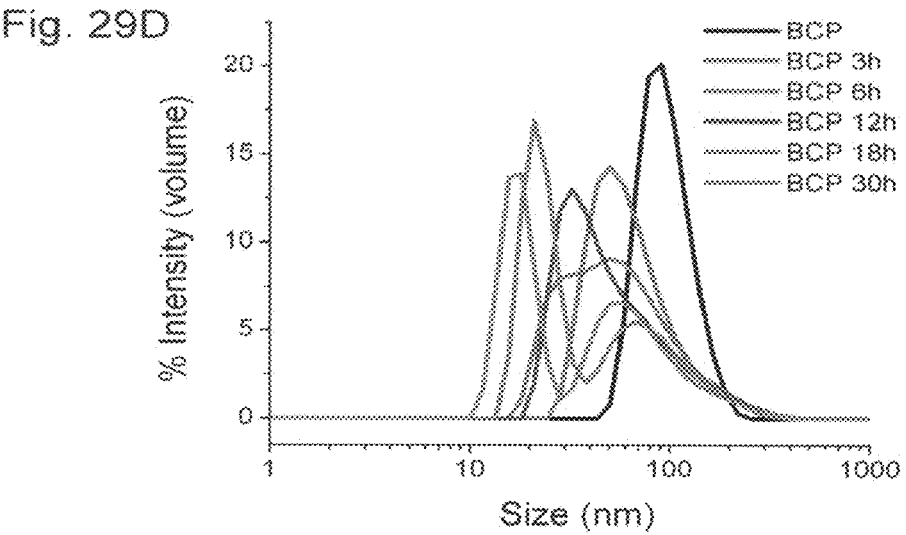

As mentioned earlier, the release kinetics of Nile red from the polymer micelle were found to be slow (about 3 days) in response to either pH or redox potential. It was thought to combine both pH and redox potential. Simultaneous cleavage of the disulfide linkages as well as the acetal group should result in a rapid collapse of the micelle, providing an enhancement in the release kinetics of the encapsulated guest molecule. To test this hypothesis, a BCP6 solution encapsulating Nile red was subjected to glutathione (1 mg/mL) and acetate buffer of pH 5.0. The release profile of Nile red was monitored and plotted against time (FIG. 29C). Interestingly, a dramatic increase in the release rate of Nile red was observed and complete release was obtained within 24 h. A DLS experiment was carried out to further investigate the rapid disassembly of micelle. The solution of BCP was treated with glutathione (1 mg/mL) and acetate buffer of pH 5.0 and the size of the micelle was monitored with the progress of time (FIG. 29D). The result indicates that the micelles were indeed cleaved faster: i.e., within 30 h compared to that of 48 h in presence of acid alone. Thus, a BCP decorated with multiple stimuli-sensitive elements provides an opportunity to fine tune various parameters to obtain a desired release profile.

EXAMPLES OF THE INVENTION

The following non-limiting examples and data illustrate various aspects and features relating to the block copolymers and/or methods of the present invention, including the assembly of nano-structured thin films, as are available through the synthetic methodologies and fabrication techniques described herein. In comparison with the prior art, the present copolymers and/or methods provide results and data which are surprising, unexpected and contrary thereto. While the utility of this invention is illustrated through the use of several copolymers, block constituents and functional groups, it will be understood by those skilled in the art that comparable results are obtainable with various other block constituents, functional groups and/or moieties, as are commensurate with the scope of this invention.

Materials and Techniques. S-(Thiobenzoyl)thioglycolic acid, 2,2'-Dithiodipyridine, 2-Mercaptoethanol, polyethylene glycol monomethyl ether (MW 5000), D,L-dithiothreitol (DTT), thioglycolic acid (98%), p-toluenesulfonic acid monohydrate (PTSA), N,N'-dicyclohexylcarbodiimide (DCC) and 4-(dimethylamino)pyridine (DMAP) from Aldrich were used as received and the other conventional reagents were used as received. Compounds were synthesized according to the procedures described, then purified by silica gel column chromatography or precipitation. Compound 1 (example 7) was prepared using procedure according to the literature. (See, Ghosh, S.; Basu, S.; Thayumanavan, S. *Macromolecules* 2006, 39, 5595-5597.) $^1$H-NMR spectra were recorded on a 400 MHz Broker NMR spectrometer using the residual proton resonance of the solvent as the internal standard. Chemical shifts are reported in parts per million (ppm). When peak multiplicities are given, the following abbreviations are used: s, singlet; d, doublet; t, triplet; m, multiplate; b, broad. $^{13}$C-NMR spectra were proton decoupled and recorded on a 100 MHz Bruker spectrometer using carbon signal of the deuterated solvent as the internal standard. UV-visible absorption spectra were recorded in Cary 100 spectrophotometer. Molecular weights of the polymers were estimated by gel permeation chromatography (GPC) using either PMMA standard or PS standard with a refractive index detector. The samples were eluted with 0.1 LiCl solution of DMF. Initiator 1 was synthesized following previously reported procedure (Bontempo, D.; Heredia, K. L.; Fish, B. A.; Maynard, H. D. *J. Am. Chem. Soc.* 2004, 126, 15372.). The surface topography of PS-b-PEO thin films on a silicon wafer was imaged by scanning force microscopy (Digital Instruments, Nanoscope III) in the tapping mode. The film thickness was measured by ellipsometry. For TEM in plane view, the nanoporous thin film was floated off from the silicon substrate onto 5 wt % HF solution and collected on a carbon-coated grid. Transmission electron microscope (TEM) was performed at 100 kV using JEOL 100CX.

Example 1

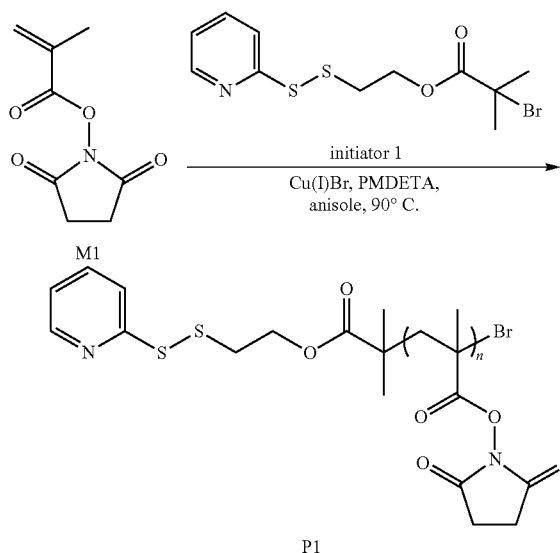

Typical procedure for polymerization with ATRP: 26 mg (0.18 mmol) of Cu(I)Br was taken in a 10 mL round bottom flask equipped with a septum and gas inlet/outlet. The flask was degassed with argon for 5 min. Then, 80 μL (0.36 mmol) of N,N,N',N',N''-pentamethyl diethylenetriamine (PMDETA) was added and stirred for 5 more minutes. To this reaction mixture, a solution of the monomer M1 (1.0 g, 5.4 mmol) in 1.0 mL degassed anisole was added and it was stirred for another 5 minutes. To this homogeneous mixture, 60 μL (0.18 mmol) of the initiator 1 was added and the flask was transferred to a preheated oil bath at 90° C. The polymerization was carried out at the same temperature under argon atmosphere for 2 h. After that, the reaction was stopped and the polymer was dissolved in DMF and then precipitated from acetone and dried in vacuum at 45° C. for 5 h.

TABLE 2

| | Detail of the polymerization | | | | | |
|---|---|---|---|---|---|---|
| Polymer | Momomer | Monomer/CuBr/ PMDETA/ initiator 1 | time | % yield | Mn | PDI |
| P1 | N-hydroxy succinimidyl methacrylate | 50/1/2/1 | 30 min | 74% | 9940 | 1.28 |
| P2 | Methyl methacrylate | 100/1/2/1 | 5 hr | 75% | 9640 | 1.21 |
| P4 | styrene | 100/1/2/1 | 24 hr | 35% | 5130 | 1.22 |
| P5 | t-butyl methacrylate | 100/1/2/1 | 24 hr | 40% | 4610 | 1.46 |
| P6 | 2-THP-protected hydroxyethyl methacrylate | 50/1/2/1 | 1 hr | 78% | 9870 | 1.26 |

Example 2

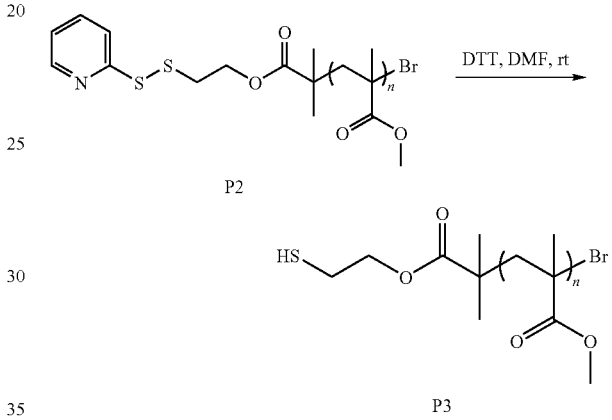

Typical procedure to generate thiol functional group in the chain end: To a solution of P2 (200 mg) in 1 mL DMF was added DTT (10 equivalents with respect to the pyridine disulfide) was added to solution. The absorbance spectra of the reaction mixture was monitored by taking an aliquot of the reaction mixture and diluting it. A new peak at 375 nm was observed indicating that the formation of 2-pyridinethione as a result of the cleavage of the pyridine disulfide bond. The evolution of this peak with time was monitored and the reaction was stopped when the peak intensity did not increase further, suggesting the completion of the reaction. The resulting polymer P3 was washed several times with water/methanol mixture and the absorbance spectra was checked again. The absence of any peak at 280 nm confirmed the conversion of the pyridine disulfide functionality to the free thiol.

Example 3

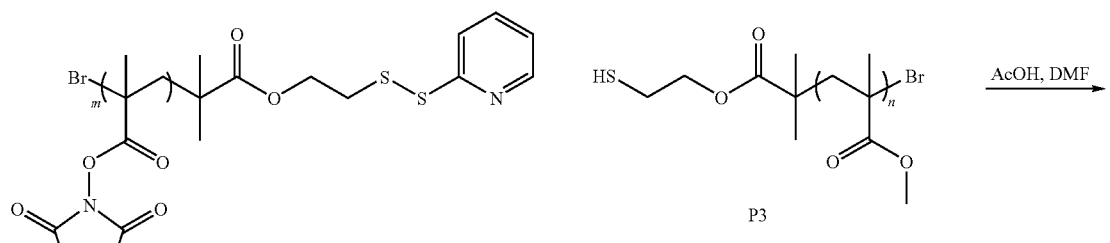

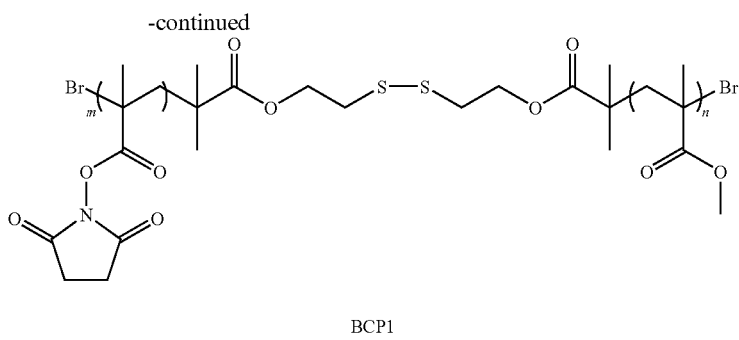

BCP1

Typical procedure to generate block copolymer by substitution reaction. To a solution of 200 mg of P1 in 0.5 mL dry DMF was added 20 μL of glacial acetic acid. To this stirred mixture, 2 equivalents of P3 (with respect to P1) were added and the reaction mixture was stirred at room temperature. The absorbance spectrum of the reaction mixture was monitored using the new peak at 375 nm as mentioned above, indicating that the formation of 2-pyridothione as a result of the cleavage of the pyridine disulfide bond. The evolution of this peak with time was monitored and the reaction was stopped when the peak intensity did not increase further, suggesting the completion of the reaction. The resulting polymer BCP1 was precipitated out by using diethyl ether and the absorbance spectra was checked again. The absence of any peak at 280 nm confirmed the conversion of the pyridine disulfide functionality to the free thiol.

Example 4

Syntheses & cleavage reactions of other block copolymers: The schemes adopted for achieving the synthesis of BCP2-BCP4 and the characterization data based on UV-visible absorption spectroscopy, GPC, and $^1$H NMR spectroscopy.

Example 4a

Synthesis of block copolymer of poly(N-hydroxysuccinimide methacrylate)-b-styrene (BCP2). See also FIGS. 6-9.

Scheme 4.
The polymerization of styrene (P4), generation of free thiol by reducing agent dithiothreitol (DTT) (P9), and formation of block copolymer by exchanging of pyridyl disulfide (BCP2)

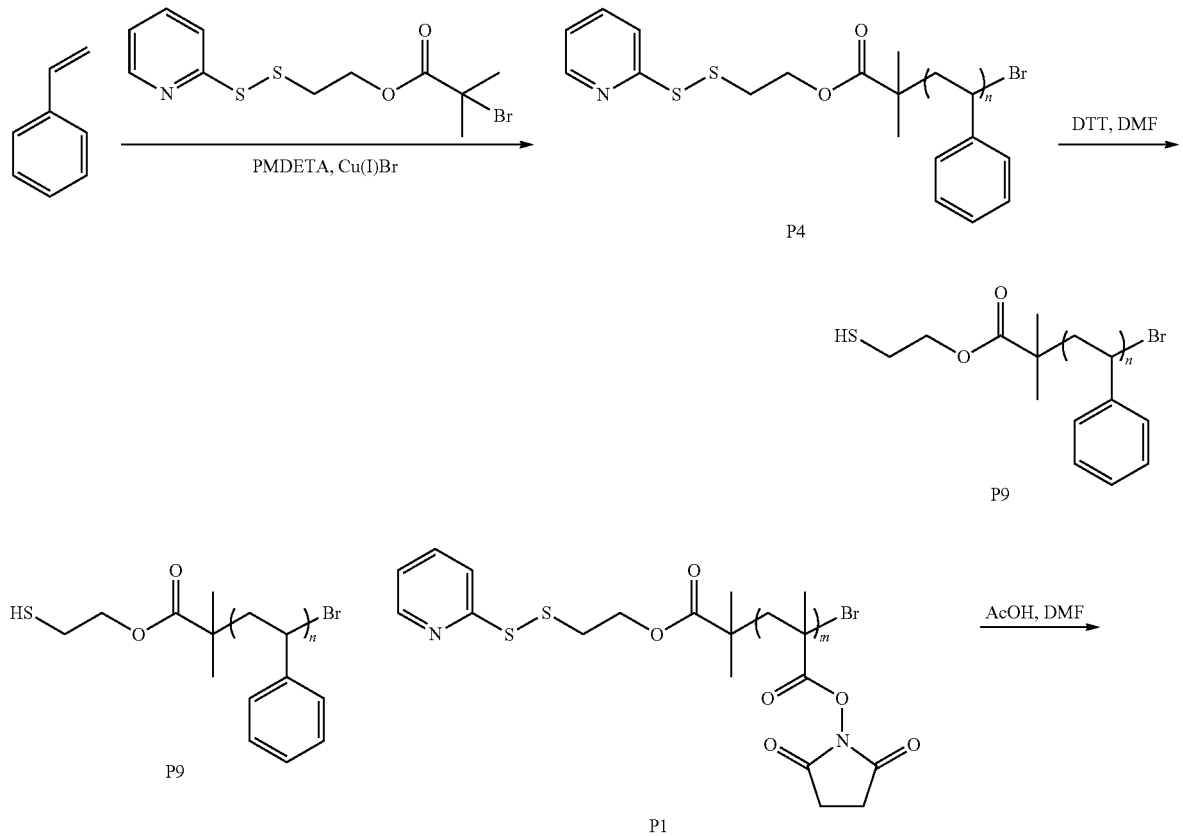

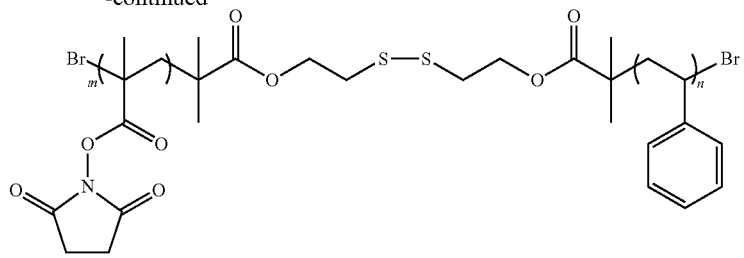
BCP2
Example 4b
Synthesis of block copolymer of poly(N-hydroxysuccinimide methacrylat)-b-(t-butyl methacrylate) (BCP3). See, FIGS. 10-13.
Scheme 5.
The polymerization of t-butyl methaacrylate (P5), generation of free thiol by reducing agent dithiothreitol (DTT) (P10), and formation of block copolymer by exchanging of pyridyl disulfide (BCP3).
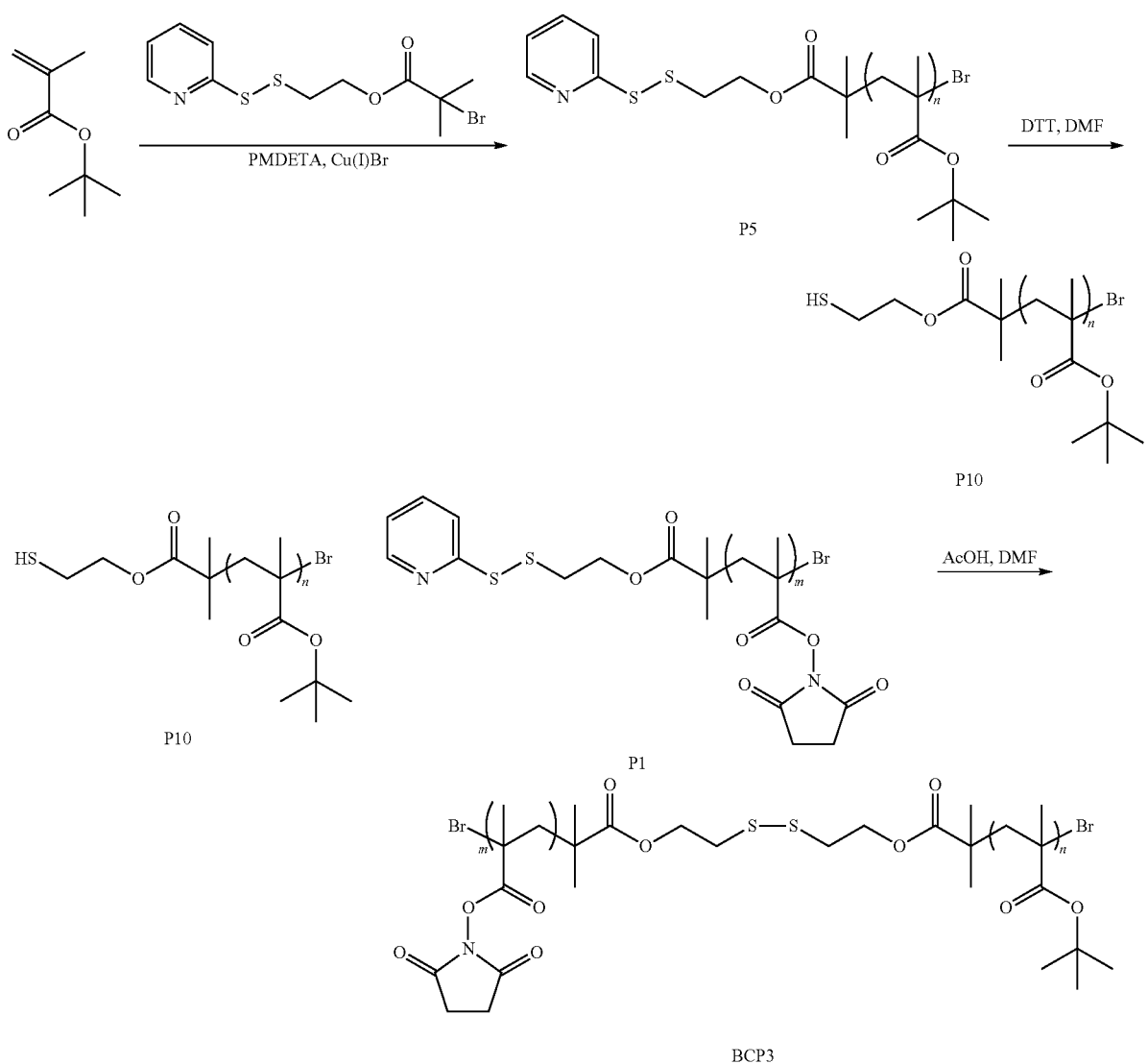

Example 4c
Synthesis of block copolymer of poly(N-hydroxysuccinimide methacrylate)-b-(protected hydroxylethyl methacrylate)(BCP4). See, FIGS. 14-18.
Scheme 6.
The polymerization of protexted hydroxylethylmethacrylate (P6), generation of free thiol by reducing agent dithiothreitol (DTT) (P7), and formation of block copolymer by exchanging of pyridyl disulfide (BCP4).
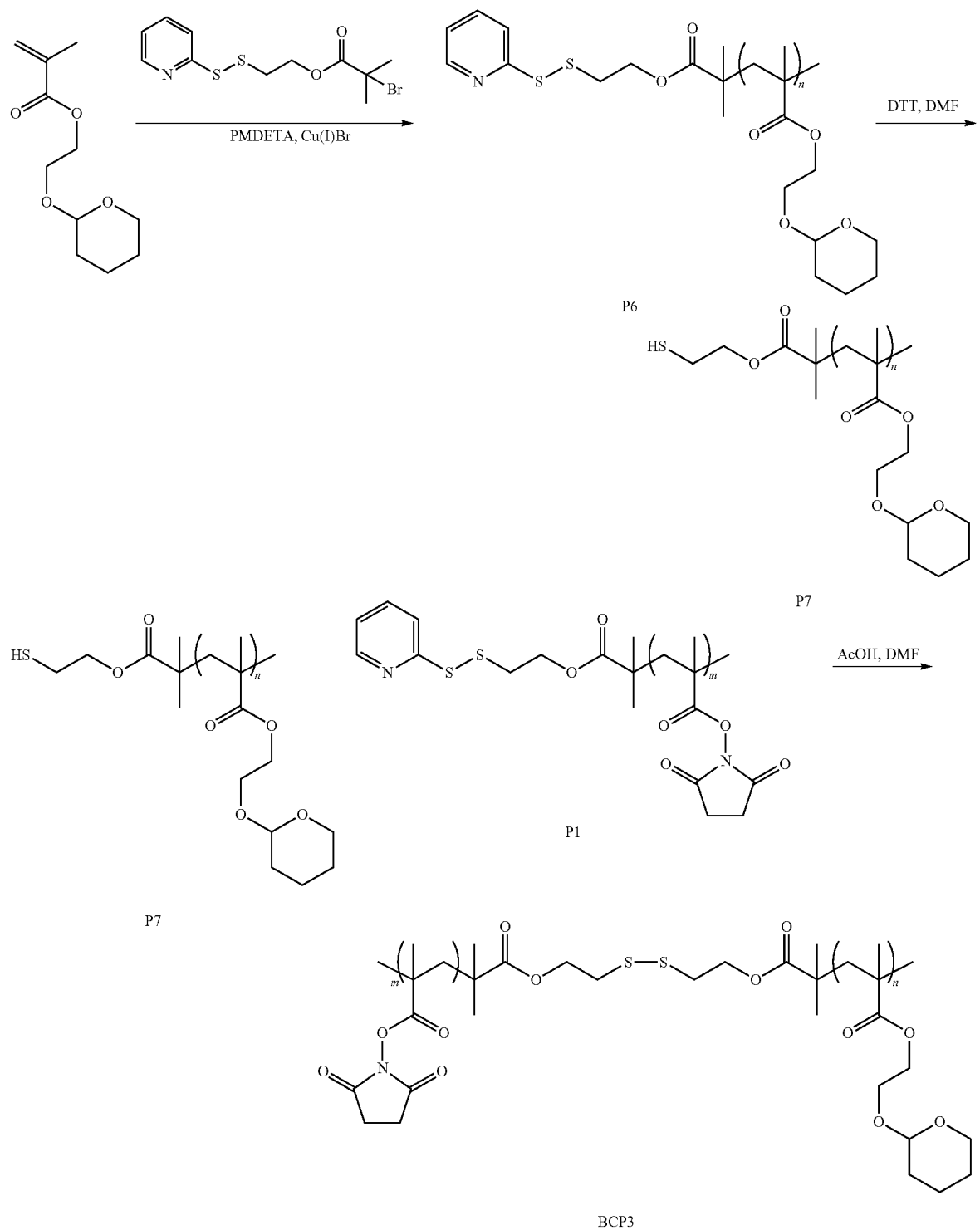

Example 5

To prepare a nanoporous thin film or template, a block copolymer containing two blocks that are sufficiently immiscible connected by a disulfide linker are synthesized using the methods described above. An example of such a block copolymer is polystyrene-S-S-polyacrylic acid, which is amphiphilic. Polystyrene is soluble in chloroform while polyacrylic acid is not, and vice versa in water. This block copolymer is spin coated on a surface and annealed. The annealed block copolymer affords distinct microphase separated morphologies, the nature of which is dependent on the volume fractions of the polystyrene block and polyacrylic acid block. After the phase separation, the film is treated with a solution of DTT in water. Since, the polyacrylic acid is soluble in water and since DTT can cleave the disulfide bond, the remaining film will contain a polystyrene film with well-defined pores of nanoscale dimensions. Alternatively, when carried out in chloroform, nanoporous polyacrylic acid film is obtained. The interface of these porous structure is left with thiol functionality, which can be used as the functional group handle for the preparation for a variety of nanocomposite materials.

Example 6

Gold nanorods can be prepared using the block copolymer templates and thiol-functionalized polymer interfaces as follows: gold nanoparticles are typically obtained from a solution of $HAuCl_4$ and sodium citrate tribasic dehydrate. These gold nanoparticles are treated with the thiol-functionalized porous templates obtained from the block copolymer-based approach outlined above and illustrated in the preceding example. The pores of the template have free thiols, which will react with gold nanoparticles and result in the formation of gold modified nanopore walls. This template will then be treated with a gold plating solution having $Na_2SO_3$, $NaHCO_3$, HCHO and Oromerse part B (a commercially available gold plating solution). The immobilized gold nanoparticles act as catalytic site for further growth of gold from the plating solution and therefore the gold formation will occur only within the nanopore walls, where the gold nanoparticles are previously incorporated. These systematically organized gold nanorods can then be used for the generation of nanostructures suitable for nanostructured solar cells and sensing technologies.

Various other polymer and copolymer compounds, including the diblock copolymers and related structures of FIG. 19, can be prepared in accordance with examples 7-13, below, with such synthetic procedures used in the preparation of PS-ss-PEO block copolymers shown schematically.

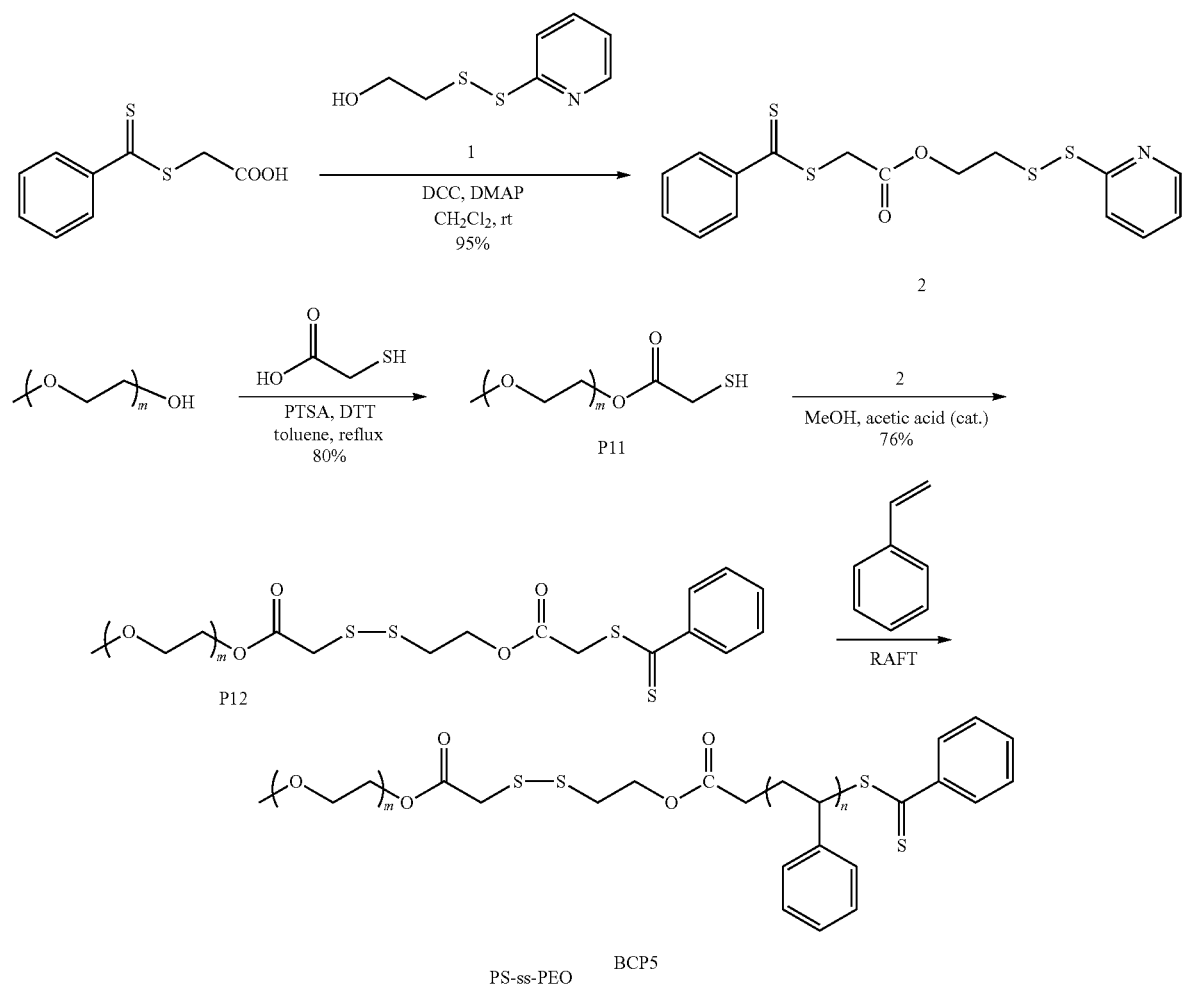

Synthesis of PS-ss-PEO Block Copolymer

Example 7

Synthesis of compound 2. Compound 1 (6 g, 32.04 mmol) was dissolved in 50 mL of dichloromethane and S-(thiobenzoyl)thioglycolic acid (8.2 g, 38.45 mmol) was added. To this solution was added DCC (7.9 g, 38.45 mmol), DMAP (1.2 g, 9.61 mmol) and this mixture solution was stirred for 12 h at room temperature. The reaction was stopped and the solvent was evaporated. The crude product was purified by column chromatography using silica gel as stationary phase and mixture of ethyl acetate/hexane (2:1 v/v ratio) as eluent to yield 11.6 g (95%) as a red liquid. $^1$H-NMR (CDCl$_3$, ppm) δ: 8.41 (d, 1H), 7.97 (d, 2H), 7.64-7.47 (m, 3H), 7.34 (t, 2H), 7.03 (t, 1H), 4.37 (t, 2H), 4.61 (s, 2H), 3.02 (t, 2H); $^{13}$C-NMR (CDCl$_3$, ppm) δ: 213.9, 167.11, 159.54, 149.74, 144.06, 137.14, 132.93, 128.50, 127.00, 120.96, 119.86, 63.59, 39.00, 37.17.

Example 8

Synthesis of Compound P11. Methoxypolyethylene glycol 5000 (5.0 g, 1.0 mmole) and PTSA (17 mg, 0.1 mmole) were taken into a round bottom flask and dissolved those chemical with freshly toluene. To this solution, thioglycolic acid (365 mg, 4.0 mmole) was then added slowly. The solution was then refluxed under Ar atmosphere for overnight. After the completion of the reaction, the mixture was cooled down and toluene was evaporated under low pressure. The residue was partitioned using dicholoromethane/water, dried over MgSO4. The organic layer was collected and concentrated under low pressure. To this crude product, the compound was then dissolved in 20 mL methanol followed by adding DTT (308 mg, 2.0 mmole) to reduce the possibility of forming disulfide. The solution was stirred for 3 h at room temp. The resulting solution was then precipitated in diethylether 5 times to remove DTT. 4.0 g of the pure product was obtained as white solid in 80% yield. GPC (THF) Mn: 5400. PDI: 1.06. $^1$H NMR (400 MHz, CDCl$_3$) δ: 4.27 (t, 2H), 3.79-3.44 (m, 456H), 3.35 (s, 3H); 13C NMR (100 MHz, CDCl$_3$) δ: 170.9, 70.3, 64.8, 59.7.

Example 9

Synthesis of Compound P12. Compound 2 (1 g, 2.60 mmol), compound P11 (3.3 g, 0.65 mmole), and 0.79 mL glacial acetic acid was dissolved in 50 mL methanol and the reaction mixture was stirred at room temperature for 6 h under Ar atmosphere. The reaction was stopped and the solvent was evaporated. The crude product was purified by column chromatography using silica gel as stationary phase and mixture of ethyl acetate/hexane (4:1 v/v ratio) as an eluent. 2.7 g of the pure product (compound P12) was obtained as light red solid in 76% yield. GPC (THF) Mn: 5500. PDI: 1.04. $^1$H NMR (400 MHz, CDCl$_3$) δ: 7.99 (d, 2H), 7.53 (t, 1H), 7.37 (t, 2H), 4.42 (t, 2H), 4.27 (t, 2H), 4.21 (s, 1H), 3.80-3.42 (m, 456H)), 3.35 (s, 3H), 3.02 (t, 2H); $^{13}$C NMR (100 MHz, CDCl$_3$) δ: 213.9, 170.8, 144.0, 130.1, 128.4, 127.3, 70.3, 39.0, 37.2.

Example 10

PS-ss-PEO-RAFT Diblock Copolymer BCP5. A mixture of the PEO-RAFT macroinitiator, P12 (1.0 g, 0.2 mmol), styrene (2.9 g, 28.0 mmol), and AIBN (6 mg, 0.04 mmol) was dissolved in benzene (1 mL) and degassed by performing the three freeze-pump-thaw cycles. The reaction mixture was sealed and then put into pre-heated oil bath at 115° C. for 12 h. The resulting mixture was dissolved in dichloromethane (5 mL) and precipitated into hexane (200 mL). To remove unreactive PEO homopolymers, the precipitate was further dissolved in dichloromethane (5 mL) and re-precipitated in methanol (200 mL) to yield purified the diblock copolymer, PS-ss-PEO, as a pink solid. Yield: 22%. GPC (THF) Mn: 25397. PDI: 1.30. $^1$H NMR (400 MHz, CDCl$_3$) δ: 7.26-6.46 (b, 714H), 4.40-4.30 (b, 4H), 3.80-3.42 (m, 456H)), 2.04-0.89 (b, 425H). The relative amount of PS block and its associated molecular weights could be determined by $^1$H NMR based on the known molecular weight of 5.0 kg mol-1 of the starting PEO block (m=114). Mn from NMR was observed to be 20.2 kg mol-1.

Example 11

Preparation of the Thin Films. The PS-ss-PEO diblock copolymer was spin coated from benzene solutions onto silicon substrates and then annealed in a benzene/water (3/1, v/v ratio) atmosphere. To cleave the PEO block, the copolymer film was immersed into 0.1 M DTT solution in ethanol for 12 hours and then rinsed with ethanol.

Example 12

Metal loading inside pore. Nanoporous films were immersed into a medium comprising a suitable metal precursor, e.g., HAuC14 (0.1 wt % in ethanol) or AgNO$_3$ (0.1 wt % in water) solution for 1 h and then rinsed with water. These metal-anchored films were reduced by N2H4 1% aqueous solution and rinsed with water.

Example 13

Grazing incidence small angle X-ray scattering (GISAXS) experiment. GISAXS measurements were performed on beamline 7.3.3 at the Advanced Light Source at the Berkeley National Laboratory. The experimental set-up and sample cell were designed for the surface studies on thin films. An X-ray beam impinged onto the sample at a grazing angle slightly above and below the critical angle of the polymer film (αc=0.16) but below the critical angle of the silicon substrate (αc=0.28). The wavelength of X-rays used was 1.240 Å, and the scattered intensity was detected by using two-dimensional charge-coupled device (CCD) camera with image sizes of 2304×2304 pixels.

Various block copolymers of this invention can be assembled into corresponding micellar configurations, such copolymeric micelles as can also comprise one or more components or moieties sensitive and/or responsive to one or more physical, chemical and/or environmental stimuli. Such copolymers, micelles and related compositions (e.g., guest/host) can be prepared as illustrated in examples 14-18 and with consideration of the following.

Materials. All the reagents were purchased from commercial sources and were used as received. Initiator 1 was synthesized according to a reported procedure (Bontempo, D.; Heredia, K. L.; Fish, B. A.; Maynard, H. D. *J. Am. Chem. Soc.* 2004, 126, 15372.). Tris[2-(dimethylamino)ethyl]amine (Me$_6$-TREN) was synthesized by methylation of tris(2-aminoethyl)amine (TREN), following a reported procedure (George J. P. Britovsek.; Jason England.; Andrew J. P. White. *Inorg. Chem.* 2005, 44, 8125.)

Analytical Techniques. $^1$H NMR and $^{13}$C NMR were recorded in Broker 400 MHz NMR spectrometer. UV-visible spectra were recorded in Cary 100 Scan UV-visible Spectrophotometer. Fluorescence spectra were recorded in JASCO FP-6500 spectrofluorimeter. Molecular weights of the polymers were estimated by gel permeation chromatography (GPC) using PMMA standard employing RI detector. The elution samples were dissolved in DMF with 0.1M LiCl. (flow rate: 1.0 mL/min, temperature: 50° C.)

Turbidity Measurements. Turbidity measurements were carried out using a CD spectrophotometer. The dialyzed aqueous solutions prepared from micelle formation were taken in quartz cell and the HT voltage was monitored at various temperatures.

Dynamic Light-Scattering (DLS) Experiments. The size distribution of micelles was determined by Nano series Nano-ZS (Malvern Instrument) Zetasizer. The dialyzed aqueous solution prepared from micelle formation (0.2 mg/mL) was filtered through a 0.22 μm filter and the size of micelle was measured at room temperature.

Micelle Formation. The diblock copolymer BCP6 (20 mg) was dissolved in 2 mL DMF in a dialysis tube (molecular weight cutoff: 2000 g/mol) and subjected to dialysis against 2000 mL distilled water for 48 h. The solution was then filtrated and lyophilized before using for further studies.

Example 14

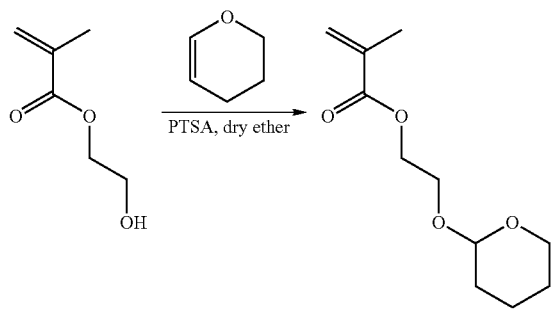

Synthesis of THP protected HEMA: To a solution of Hydroxyethylmethacrylate (HEMA) (10 g, 0.077 mol) in 30 mL of dry ether was added p-toluene sulfonic acid (PTSA) (1.3 g, 0.0077 mol). To this reaction mixture, a solution of 2,3-dihydropyran (THP) (10 mL, 0.12 mol) in 5 mL dry ether was added dropwise at 0° C. The reaction mixture was allowed to stir at room temperature for 3 h, concentrated and purified by column chromatography (SiO$_2$). The column was eluted with ethyl acetate/hexane (1:4 v/v) to afford the desired product (16.5 g, 83%) as light yellow oil. $^1$H NMR (CDCl$_3$): δ (ppm): 6.02 (s, 1H), 5.46 (s, 1H), 4.56 (t, 1H), 4.24-4.18 (m, 2H), 3.86-3.80 (m, 1H), 3.76-3.71 (m, 1H), 3.60-3.55 (m, 1H), 3.41-3.38 (m, 1H), 1.84 (s, 3H), 1.72-1.68 (m, 1H), 1.60-1.57 (m, 1H), 1.51-1.42 (m, 4H). $^{13}$C NMR (CDCl$_3$): δ (ppm): 165.5, 135.5, 123.9, 97.2, 63.9, 62.8, 60.2, 29.5, 24.6, 18.1, 17.1.

Example 15

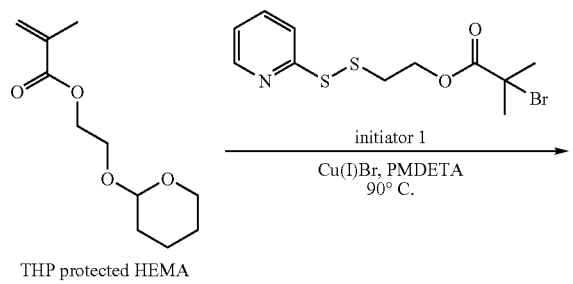

THP protected HEMA

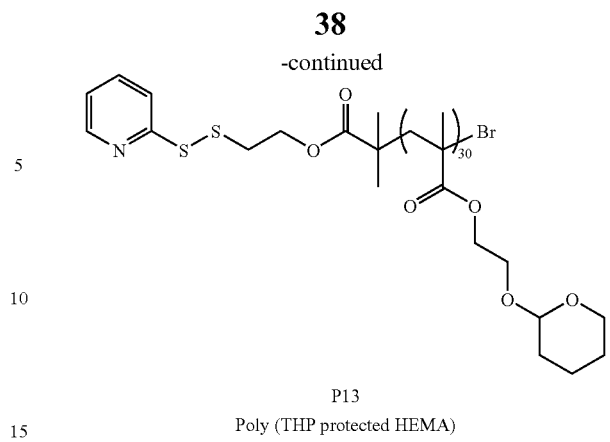

P13
Poly (THP protected HEMA)

Polymerization of THP protected HEMA using ATRP. 26 mg (0.18 mmol) of Cu(I)Br was taken in a 10 mL round bottom flask equipped with a septum and gas inlet/outlet. The flask was degassed with argon for 5 min and 80 μL (0.36 mmol) of N,N,N',N',N''-pentamethyl diethylenetriamine (PMDETA) was added to it. The reaction mixture was stirred at RT for 5 min and a solution of THP protected HEMA monomer (1.5 g, 7.0 mmol) in 1.0 mL degassed anisole was added. The reaction mixture was stirred at RT for another 5 min. To this homogeneous mixture, 60 μL (0.18 mmol) of the initiator 1 was added and the flask was transferred to a pre-heated oil bath at 90° C. The polymerization was carried out at the same temperature under argon atmosphere for 1 h. The reaction was stopped and the polymer was dissolved in DMF and then precipitated from methanol and dried under vacuum at 45° C. for 5 h.

Example 16

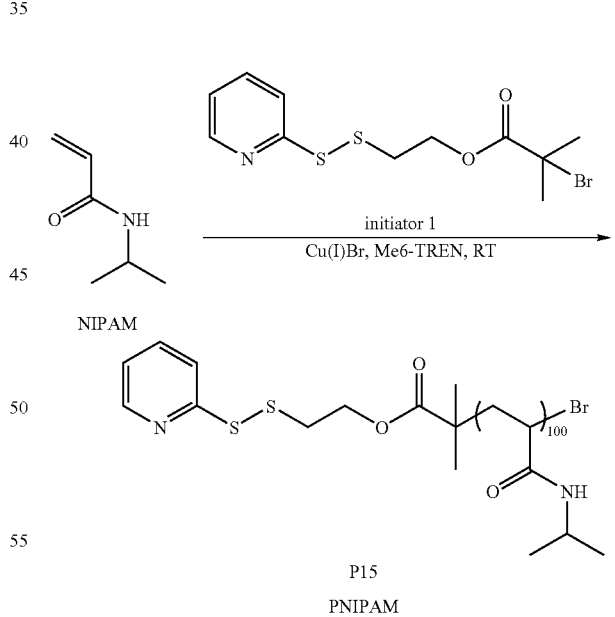

P15
PNIPAM

Polymerization of NIPAM using ATRP. 26 mg (0.18 mmol) of Cu(I)Br was taken in a 25 mL round bottom flask equipped with a septum and gas inlet/outlet. The flask was degassed with argon for 5 min and 83 μL (0.36 mmol) of Me$_6$-TREN was added to it. The reaction mixture was stirred at RT for 5 min and 1.5 mL of t-butanol purged with argon was added to it, followed by NIPAM (3.055 g, 27 mmol). The reaction mixture was stirred at RT for another 5 min and 5 mL of milliQ water purged with argon was added, followed by the initiator 1 (60 μl, 0.18 mmol). The reaction mixture was stirred at room temperature for 20 min, during which the polymerization was complete. The polymer was dissolved in acetone, precipitated from ethyl ether and dried under vacuum.

TABLE 4

Details of Polymerization (Ex. 15 v. Ex. 16)

| Polymer | monomer | Monomer/ CuBr/ Ligand/ initiator | Solvent | Ligand | Time (min)/ Temp (° C.) | % Yield | Mn (g/mol) | PDI |
|---|---|---|---|---|---|---|---|---|
| PNIPAM | (acrylamide, isopropyl) | 150:1:2:1 | t-butanol/ water (50%) | Me$_6$-TREN | 20 min/ room temp. | 76% | 11300 | 1.24 |
| P(THP protected HEMA) | (methacrylate, THP-protected hydroxyethyl) | 40/1/2/1 | Anisole | PMDETA | 60 min/ 90° C. | 89% | 6400 | 1.13 |

*estimated by GPC (DMF) using PMMA standard.

Example 17

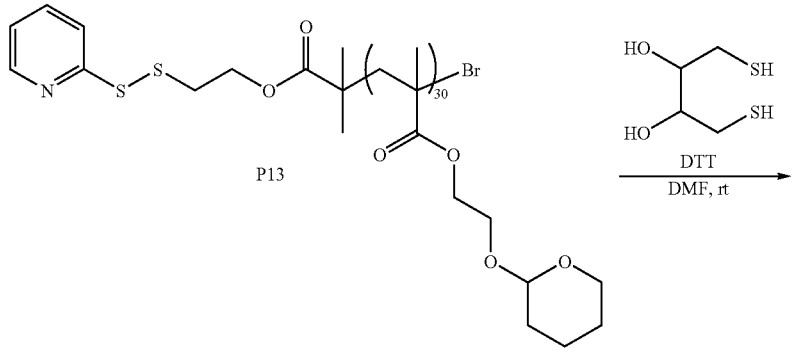

P13

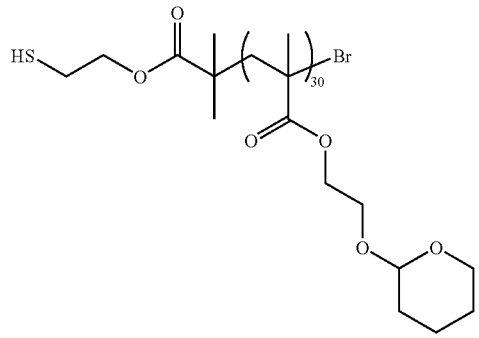

P14

Procedure to generate thiol functional group in the chain end. To a solution of P13 (500 mg) in 1 mL DMF was added DTT (10 equivalents with respect to the pyridine disulfide) was added to solution. The absorbance spectrum of the reaction mixture was monitored by taking an aliquot of the reaction mixture and diluting it. A new peak at 375 nm was observed indicating that the formation of 2-pyridinethione as a result of the cleavage of the pyridine disulfide bond. The evolution of this peak with time was monitored and the reaction was stopped when the peak intensity did not increase further, S3 suggesting the completion of the reaction. The resulting polymer P14 was washed several times with water/methanol mixture and the absorbance spectra was checked again. The absence of any peak at 280 nm confirmed the conversion of the pyridine disulfide functionality to the free thiol.

precipitated out by using diethyl ether and the absorbance spectra was checked again. The absence of any peak at 280 nm confirmed the conversion of the pyridine disulfide functionality to the free thiol.

The present invention demonstrates, inter alia, that (i) a variety of cleavable block copolymers can be synthesized by a simple combination of the homopolymers synthesized by ATRP; (ii) complementary reactive functionalities can be incorporated in these block copolymers that allow for incorporation of additional functionalities in a post-polymerization step; and (iii) disulfide-containing block copolymers can be cleaved in to its constituent blocks under mild redox reaction conditions. The methodology and materials developed here can potentially impact a variety of areas. For example, in this methodology, block copolymers with constituent block active chain ends can be used to prepare, for instance, triblock and tetrablock copolymers, with the cleavable unit strategically positioned. And, as discussed above, the generation of microphase-separated nanostructures can then be used for achieving nanoporous structures in which the interfaces are Example 18

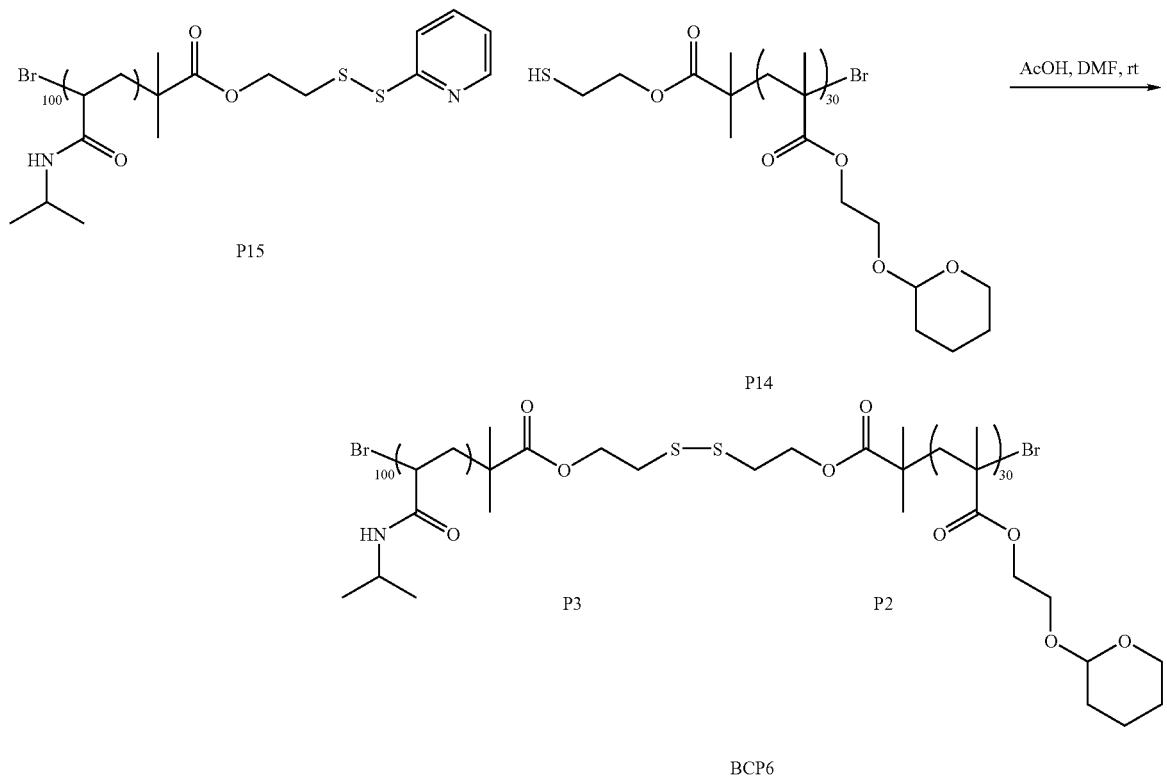

Procedure to generate block copolymer by substitution reaction. To a solution of 200 mg of P15 in 0.5 mL dry DMF was added 20 μL of glacial acetic acid. To this stirred mixture, 1.2 equivalents of P14 (with respect to P15) were added and the reaction mixture was stirred at room temperature. The absorbance spectrum of the reaction mixture was monitored using the new peak at 375 nm as mentioned above, indicating that the formation of 2-pyridothione as a result of the cleavage of the pyridine disulfide bond. The evolution of this peak with time was monitored and the reaction was stopped when the peak intensity did not increase further, suggesting the completion of the reaction. The resulting polymer BCP6 was decorated with highly reactive thiol functionalities. Such nanostructures can be utilized to achieve a variety of composite structures with implications in subsequent materials and biology applications. Alternatively, various block copolymers of this invention can be designed and synthesized to incorporate moieties imparting amphiphilic character and, depending upon a fluid medium, can provide for assembly of corresponding micelles or vesicles for transport and/or delivery of a reactive or therapeutic agent in the medium. Such assemblies can then be disrupted or altered in response to the presence or elevated concentration of a disulfide reducing agent. For instance, assemblies with incorporation of a chemotherapeutic drug can be used to treat cancer cells, where elevated concentrations of glutathione can induce disulfide cleavage, assembly disruption and drug delivery. Both micelles and vesicles can be assembled, incorporating either hydrophilic or hydrophobic active agents, and disrupted as described herein for corresponding delivery.

We claim:

1. A block copolymer compound of a formula

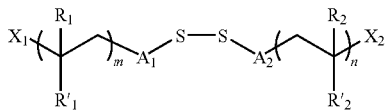

wherein $R_1$, $R'_1$, $R_2$ and $R'_2$ are independently selected from H, alkyl, substituted alkyl, aryl, substituted aryl, carboxy, substituted carboxy, alkoxycarbonyl, substituted alkoxycarbonyl, aminocarbonyl and substituted aminocarbonyl moieties; m and n are independently selected from integers greater than 1, for each respective m and n block; $A_1$ and $A_2$ are independently selected from non-halide moieties of atom transfer radical polymerization initiation reagents; and $X_1$ and $X_2$ are independently selected from other blocks of repeating monomeric units, halide moieties of said initiation reagents and polymer terminal moieties.

2. The compound of claim 1 wherein at least one of said $R_1$, $R'_1$, $R_2$ and $R'_2$ moieties is a substituted carboxy moiety.

3. The compound of claim 2 wherein $R_1$ is selected from H and methyl, $R_2$ is a substituted carboxy moiety and said block comprises a plurality of acrylate monomers.

4. The compound of claim 1 where at least one of said $R_1$, $R'_1$, $R_2$ and $R'_2$ moieties is a phenyl moiety.

5. The compound of claim 4 wherein $R_2$ is selected from H and methyl, $R'_2$ is selected from phenyl and substituted phenyl and said block comprises a plurality of styrene monomers.

6. The compound of claim 1 wherein at least one of said $A_1$ and $A_2$ moieties is an alkoxycarboxyalkyl moiety.

7. The compound of claim 6 wherein one of said moieties is an ethylcarboxylsopropyl moiety.

8. The compound of claim 7 wherein each of said $X_1$ and $X_2$ moieties is bromide.

9. The compound of claim 1 wherein at least one of said $X_1$ and $X_2$ moieties comprise another block of repeating monomeric units.

10. The compound of claim 1 in a thin film, and one said block comprises a volume fraction less than about 50 percent of said copolymer.

11. The compound of claim 10 wherein disulfide reduction and removal of said block provides said thin film comprising a plurality of nanopores therethrough and defining inner pore walls comprising a plurality of thiol moieties.

12. The compound of claim 11 wherein said thiol moieties are coupled to a thiol-reactive component.

13. The compound of claim 12 wherein said thiol moieties are coupled to a metal.

14. The compound of claim 1 wherein one said block is hydrophilic and one said block is hydrophobic, said copolymer amphiphilic.

15. The compound of claim 14 wherein one of said $R_1$ and $R'_1$ comprises a moiety exhibiting temperature-dependent reversible hydrophilic-hydrophobic characteristics, and one of said $R_2$ and $R'_2$ comprises a moiety exhibiting acid-sensitive hydrophobic-hyrophilic characteristics.

16. The compound of claim 15 wherein one of $R_1$ and $R'_1$ moieties comprises an N-isopropylaminocarbonyl moiety.

17. The compound of claim 15 wherein one of said $R_2$ and $R'_2$ comprises a dihydropyran-protected hydroxy-substituted acrylate moiety.

18. The compound of claim 14 in a fluid medium, said compound at a concentration sufficient for micellar configuration.

19. The compound of claim 18 wherein said micellar configuration is contacted with at least one of a stimulus selected from temperature, an acid and a disulfide reducing agent, said stimulus at least partially sufficient to disrupt said micellar configuration.

20. The compound of claim 18 in an aqueous medium comprising a hydrophobic component, said hydrophobic component within said micelle.

* * * * *